(12) United States Patent
Yonezawa et al.

(10) Patent No.: US 7,168,695 B2
(45) Date of Patent: Jan. 30, 2007

(54) POSITIONING DEVICE

(75) Inventors: Keitaro Yonezawa, Kobe (JP); Yosuke Haruna, Kobe (JP)

(73) Assignee: Kosmek Ltd., Kobe (JP)

( * ) Notice: Subject to any disclaimer, the term of this patent is extended or adjusted under 35 U.S.C. 154(b) by 84 days.

(21) Appl. No.: 10/534,458

(22) PCT Filed: Nov. 27, 2003

(86) PCT No.: PCT/JP03/15139

§ 371 (c)(1),
(2), (4) Date: May 11, 2005

(87) PCT Pub. No.: WO2004/050297

PCT Pub. Date: Dec. 6, 2004

(65) Prior Publication Data

US 2006/0033255 A1  Feb. 16, 2006

(30) Foreign Application Priority Data

Nov. 29, 2002 (JP) ............................. 2002-347328
Jun. 17, 2003 (JP) ............................. 2003-171645

(51) Int. Cl.
*B23Q 3/02* (2006.01)

(52) U.S. Cl. ....................... 269/309; 269/310

(58) Field of Classification Search ........ 269/309–310, 269/32, 20; 279/4.06, 4.12
See application file for complete search history.

(56) References Cited

U.S. PATENT DOCUMENTS 6,024,354 A * 2/2000 Yonezawa ................... 269/309
6,095,509 A * 8/2000 Yonezawa ................... 269/309
6,527,266 B1 * 3/2003 Yonezawa et al. .......... 269/309
6,604,738 B2 * 8/2003 Haruna ....................... 269/309
2004/0046302 A1 * 3/2004 Bernhard et al. ........... 269/309
2006/0033255 A1 * 2/2006 Yonezawa et al. .......... 269/309
2006/0049568 A1 * 3/2006 Yonezawa et al. .......... 269/309
2006/0049569 A1 * 3/2006 Yonezawa ................... 269/309
2006/0055099 A1 * 3/2006 Haruna ....................... 269/309

FOREIGN PATENT DOCUMENTS

| EP | 1 078 713 A1 | 2/2001 |
| JP | 41-022970 Y1 | 11/1966 |
| JP | 57-27640 | 2/1982 |
| JP | 60-19824 U | 2/1985 |
| JP | 5-154705 A | 6/1993 |
| JP | 2002-254266 A | 9/2002 |

* cited by examiner

*Primary Examiner*—Lee D. Wilson
(74) *Attorney, Agent, or Firm*—Bacon & Thomas, PLLC

(57) ABSTRACT

A supporting face (1a) is provided on a base plate (1), a face (2a) to be supported is provided on a work pallet (2), and an engagement hole (3) is opened in the face (2a) to be supported. A core column (11) is projected upward from a housing (9) fixed to the base plate (1). An elastic sleeve (12) that fits in the engagement hole (3) is supported in a space at the outer periphery of the core column (11), on the upper face of the housing (9). Wedge spaces (W) narrowing downward are circumferentially arranged at an substantially equal intervals between the core column (11) and the elastic sleeve (12). Wedge members (15) are vertically movably inserted in each of the wedge spaces (W). Input portions (20) of the wedge members (15) are connected to an output portion (44) of an upper rod (43) of a piston (33).

24 Claims, 32 Drawing Sheets

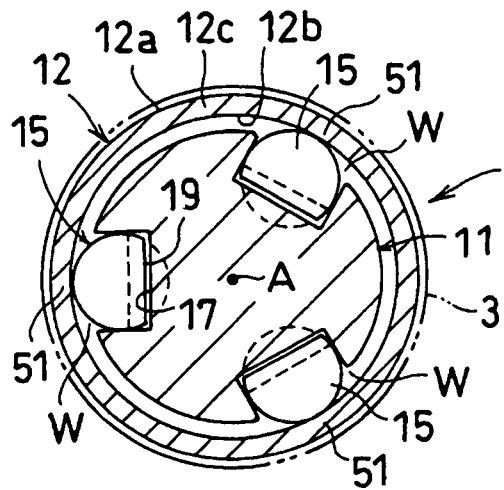
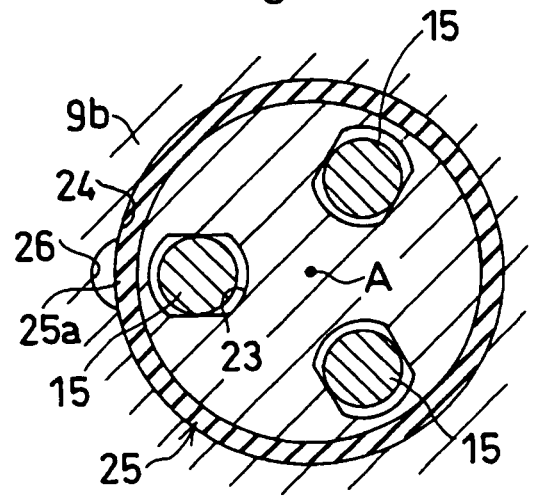
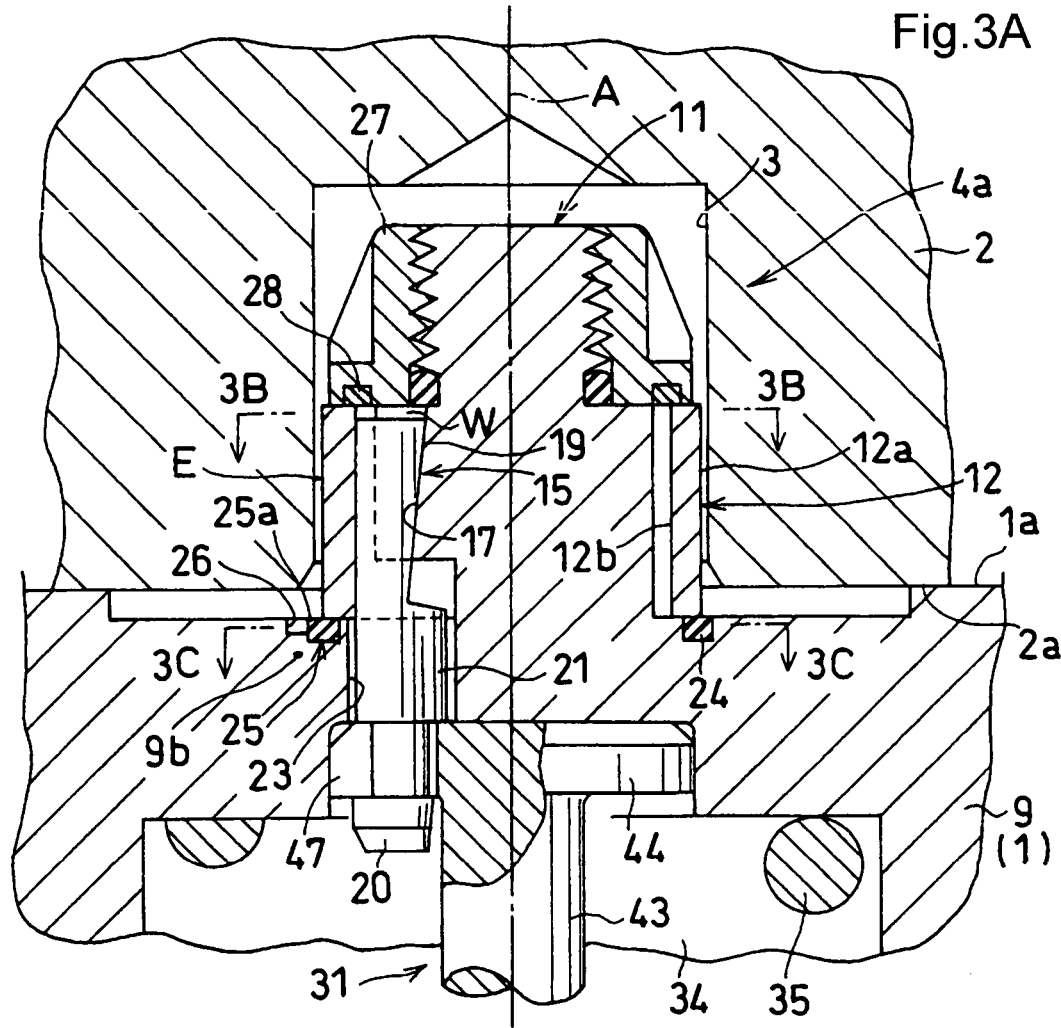

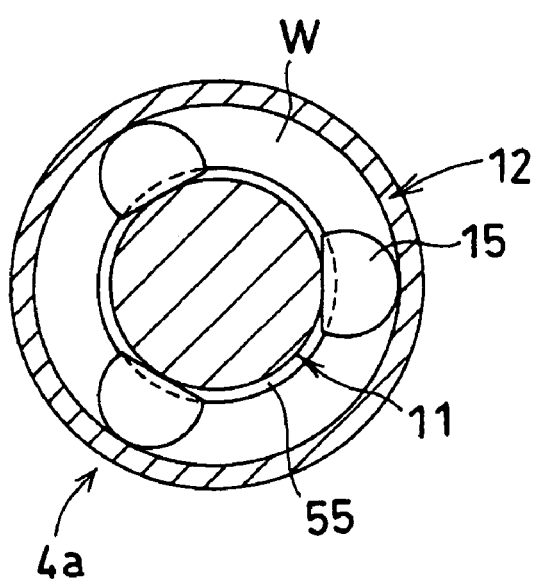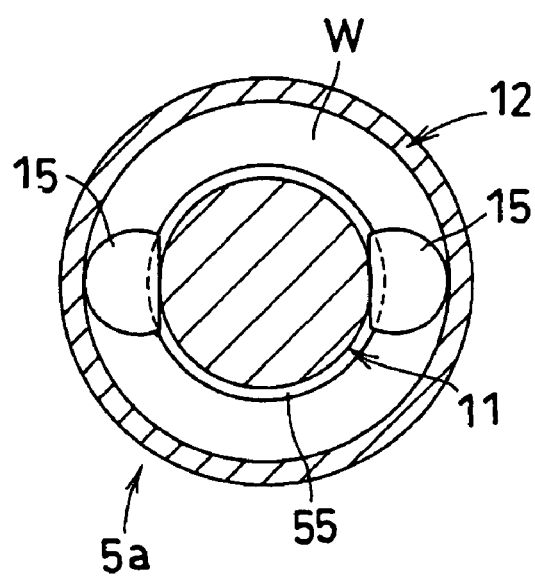

POSITIONING DEVICE

This application is a National Stage application of PCT/JP03/15139, filed Nov. 27 2003.

TECHNICAL FIELD

The present invention relates to an apparatus for positioning a second block such as a work pallet or a work piece in a first block such as a table of a machine tool.

BACKGROUND ART

This kind of positioning apparatus is generally arranged in such a manner that a circular engaging hole opened in a surface to be supported of the second block is fitted to a plug projected from a support surface of the first block (refer to Japanese Patent Public Disclosure No. 57-27640, for example).

In the case of the prior art, it is necessary to provide a predetermined fitting gap between the engaging hole and the plug to fit them smoothly to each other. Consequently, the fitting gap reduces the positioning accuracy.

The present invention aims at providing an apparatus capable of positioning easily with a high degree of accuracy.

SUMMARY OF THE INVENTION

In order to accomplish the objective mentioned above, the present invention provides a positioning apparatus as described below and as shown in FIG. 1 through FIG. 5, FIG. 12 and FIG. 17, or FIG. 19 through FIG. 21, FIG. 26A through FIG. 28, FIG. 30 and FIG. 32, for example.

A support surface 1a for supporting a surface 2a to be supported of a second block 2 is provided in a first block 1. A central pillar 11 projected from the support surface 1a toward the leading end is fixed to the first block 1. An engaging member 12 to be inserted into an engaging hole 3 of the surface 2a to be supported is supported onto the first block 1 in the outer peripheral space of the central pillar 11. A wedge space W which narrows in one axial direction is provided between the central pillar 11 and the engaging member 12, a wedge member 15 being inserted into the wedge space W axially movably. The wedge member 15 is adapted to be axially movable by a driving means 31.

The central pillar 11 may be formed integrally with the first block 1, or formed separately from the first block 1 to be fixed thereto.

The engaging member 12 may be supported onto the first block 1 directly, or supported onto the first block 1 indirectly through another member such as the central pillar 11.

The engaging member 12 may also be composed of an elastic sleeve, or composed of a plurality of pressing members arranged circumferentially at intervals. Further, the former engaging member 12 composed of an elastic sleeve may be composed of a thin-walled cylinder, or formed in a collet shape by providing a slit, etc., in the peripheral wall.

The above-described invention exerts the following actions as shown in the foregoing figures, for example.

When positioning the second block against the first block, the engaging member provided in the first block and the engaging hole of the second block are first engaged with each other, and then the wedge member is moved in one axial direction, i.e., in the locking direction by the driving means. Then, the wedge member and the central pillar become wedge-engaged with each other directly or indirectly, whereby the wedge member expands at least part of the engaging member radially outward strongly. This allows a radially expanded portion of the engaging member to be brought into close contact with the engaging hole. Consequently, the second block is locked against the first block through the engaging member, the wedge member, and the central pillar in the recited order.

When releasing the above-described lock state, the wedge member is moved in the other axial direction, i.e., in the releasing direction by the driving means. Then, the wedge engagement of the wedge member is released, whereby the radially expanded portion of the engaging member can be contracted radially inward. This allows the close contact between the engaging member and the engaging hole to be released. Afterward, the second block can be separated from the first block.

The present invention exhibits the following advantages.

In a locking operation, after engaging the engaging hole and the engaging member with each other, the engaging member can be brought into close contact with the engaging hole. This allows the engaging hole and the engaging member to be engaged smoothly with each other as well as to be positioned with a high degree of accuracy against each other.

Also, the wedge member for radially expanding the engaging member can be wedge-engaged directly or indirectly with the central pillar fixed to the first block, which enables the wedge member to be moved accurately through the central pillar as a reference. This allows the engaging member to be radially expanded with a desired accuracy. Consequently, the second block can be positioned in the first block with a high degree of accuracy, and with high repeatable accuracy.

Further, in the above-described positioning state, even in the case where a large external force such as a forming force acts against the second block, the central pillar is strong enough to receive the external force, resulting in a high dynamic machining accuracy.

Furthermore, the engaging member supported onto the first block can be arranged substantially in such a manner as to be only radially movable with little axial movement. This allows the wedge space to be easily closed off from the ambient atmosphere by the engaging member, which can prevent foreign matter such as cutting oil and swarf in the ambient atmosphere from entering the wedge space.

In addition, since a radially expansible mechanism is composed of the central pillar, the wedge member, and the engaging member, the number of parts required for the radially expansible mechanism is reduced, allowing an extremely space-saving positioning apparatus to be provided.

In the above-described invention, the engaging member may be composed of an annular elastic sleeve 12 as shown in FIG. 3A through FIG. 3C, FIG. 16A, or FIG. 20B, for example.

In the above-described invention, the following arrangement may also be included as shown in FIG. 26A and FIG. 26B, for example.

The engaging member is composed of a plurality of pressing members 12 arranged circumferentially at intervals, and an annular plug 121 to be inserted into the engaging hole 3 is arranged on the outer periphery of the wedge member 15, the pressing members 12 being supported onto the peripheral wall 121a of the annular plug 121 radially movably and adapted to be movable radially inward by a restoring means 122.

In the case above, the pressing members allow for a larger amount of radial movement than the above-mentioned elastic sleeve.

In order to accomplish the objective mentioned above, in the present invention, the positioning apparatus may also be arranged as described below as shown in FIG. 1 through FIG. 5, FIG. 12 and FIG. 17, or FIG. 19 through FIG. 21, FIG. 26A through FIG. 28, FIG. 30 and FIG. 32, for example.

A support surface 1a for supporting a surface 2a to be supported of a second block 2 is provided in a first block 1. A central pillar 11 projected from the support surface 1a toward the leading end is fixed to the first block 1. An elastic sleeve 12 to be fitted to an engaging hole 3 opened in the surface 2a to be supported is supported onto the first block 1 in the outer peripheral space of the central pillar 11. A wedge space W which narrows in one axial direction is provided between the central pillar 11 and the elastic sleeve 12, a wedge member 15 being inserted into the wedge space W axially movably. A driving means 31 for moving the wedge member 15 axially is provided in the first block 1.

This invention exhibits similar advantages as the foregoing invention.

In a locking operation, after engaging the engaging hole and the elastic sleeve with each other, the elastic sleeve can be brought into close contact with the engaging hole. This allows the engaging hole and the elastic sleeve to be engaged smoothly with each other as well as to be positioned with a high degree of accuracy against each other.

Also, the wedge member for radially expanding the elastic sleeve can be wedge-engaged directly or indirectly with the central pillar fixed to the first block, which enables the wedge member to be moved accurately through the central pillar as a reference. This allows the elastic sleeve to be radially expanded with a desired accuracy. Consequently, the second block can be positioned against the first block with a high degree of accuracy, and with high repeatable accuracy.

Further, in the above-described positioning state, even in the case where a large external force such as a forming force acts against the second block, the central pillar is strong enough to receive the external force, resulting in a high dynamic machining accuracy.

Furthermore, the elastic sleeve supported onto the first block can be arranged substantially in such a manner as to be only radially movable with little axial movement. This allows the wedge space to be closed off from the ambient atmosphere easily by the elastic sleeve, which can prevent foreign matter such as cutting oil and swarf in the ambient atmosphere from entering the wedge space.

In addition, since the central pillar, the wedge member, and the elastic sleeve can provide a radially expansible mechanism, the number of parts required for the radially expansible mechanism is reduced, allowing an extremely space-saving positioning apparatus to be provided.

In the present invention, it is preferable that the central pillar 11 is formed integrally with the first block 1. In this case, the axial accuracy of the central pillar is increased, resulting in an improvement of the above-mentioned positioning accuracy and repeatability.

In the present invention, it is preferable that a ceiling wall 27 for covering the leading end portion of the wedge space W is provided in the central pillar 11. In this case, the wedge space can be closed off from the ambient atmosphere reliably, which can ensure prevention of foreign matter in the ambient atmosphere from entering the wedge space.

In the present invention, the following arrangement may also be included.

A ceiling wall 27 for covering the leading end portion of the wedge space W is provided in the central pillar 11, the leading end surface of the elastic sleeve 12 being supported onto the ceiling wall 27 radially movably and the base end surface of the elastic sleeve 12 being supported onto a supporting portion 9b of the first block 1 radially movably. This invention allows the wedge space to be kept substantially hermetically closed, which can further ensure prevention of foreign matter in the ambient atmosphere from entering the wedge space.

In the present invention, the following arrangement may also be included.

As shown in FIG. 3A through FIG. 3C, for example, a plurality of the wedge spaces W are arranged circumferentially at predetermined intervals, a plurality of the wedge members 15 being inserted into the respective wedge spaces W, and wherein a wedge surface 19 is provided in the leading end portion of each of the wedge members 15, while an input portion 20 is provided in the base end portion of each of the wedge members 15, the input portion 20 being connected to an output portion 44 of the driving means 31 radially relatively movably.

This invention allows the elastic sleeve to be radially expanded locally by the wedge members, which allows a radially expanded portion of the elastic sleeve to be brought into close contact strongly with the engaging hole. Also, since the input portion of each of the wedge members is connected to the output portion of the driving means radially relatively movably, the wedge members can be moved radially outward smoothly with a high degree of accuracy when making a wedge engagement, resulting in a further improvement of the above-mentioned positioning accuracy and repeatability.

In the present invention, the wedge space W may be formed in an annular shape.

In this invention, it is preferable that the wedge member 15 is composed of an annular collet, the wedge member 15 being adapted to be radially expansible by their own elastic restoration force. In this case, the above-described radially expansible mechanism is further simplified, allowing an inexpensive positioning apparatus to be provided.

In the present invention, it is preferable that the wedge space W and the wedge member 15 are formed in such a manner as to narrow toward the base end as shown in FIG. 3A or 20A, for example.

This invention allows the wedge member to press the second block against the first block through the engaging member in a locking operation, which allows specified clamping means to be omitted as appropriate.

In the present invention, the wedge space W and the wedge member 15 may also be formed in such a manner as to narrow toward the leading end.

This invention allows the wedge member to be inserted from the base end toward the leading end even in the case where the wedge space is arranged to be hermetically closed, involving a little trouble in incorporating the wedge member.

In the present invention, a plurality of inclined grooves 17 inclined toward the leading end may be provided on the outer periphery of the central pillar 11 as shown in FIG. 3A and FIG. 3B, for example.

This invention allows the wedge member to be guided with a high degree of accuracy by the bottom wall and the both side walls of the inclined grooves, resulting in an extreme improvement of the above-mentioned positioning accuracy and repeatability.

Also in the present invention, a tapered surface 55 which narrows toward the leading end (or a plurality of inclined surfaces inclined toward the leading end) may be provided on the outer periphery of the central pillar 11 as shown in FIG. 6A or 24, for example. This invention exhibits the effect that the above-described radially expansible mechanism gets simpler and easier to manufacture.

In the present invention, a tapered surface which narrows toward the base end may be provided on the inner periphery of the engaging member 12 as shown in FIG. 8, for example. This invention also exhibits the effect that the above-described radially expansible mechanism gets simpler and easier to manufacture.

Also in the present invention, a tapered surface which narrows toward the leading end may be provided on the inner periphery of the engaging member 12 as shown in FIG. 15C or 31, for example.

In the present invention, the following arrangement may also be included.

As shown in FIG. 3A and FIG. 3B, for example, the elastic sleeve 12 is composed of a thin-walled cylinder formed integrally in a circumferentially seamless manner, a plurality of radially expandible portions 51 in an annular wall 12c of the elastic sleeve 12, which are arranged circumferentially at intervals, being adapted to be elastically deformable radially outward and to be restorable radially inward by their own elastic restoration force.

This invention can prevent foreign matter in the ambient atmosphere from entering the wedge space reliably by the seamless elastic sleeve. In addition, since the elastic sleeve is formed in a seamless manner, foreign matter attached to the outer peripheral surface of the sleeve can be cleaned off easily with cleaning fluid such as compressed air. This allows the cleaning work to be automated to achieve maintenance-free performance, and a further positioning error due to biting-in of foreign matter to be eliminated as well as damage of the fitting portion to be prevented.

Also in the present invention, a slit 74 or at least one through groove 76 may be provided in the peripheral wall of the elastic sleeve 12, the elastic sleeve 12 being adapted to be radially contractible by its own elastic restoration force as shown in FIG. 16A or 16B, or FIG. 20A and FIG. 20B, for example. This invention can increase the amount of expansion and contraction of the elastic sleeve, and makes it easy to process the elastic sleeve simply and precisely.

An elastic sealing member 75 made of rubber or synthetic resin, etc., may be disposed in the slit 74 or the through groove 76. In this case, the elastic sealing member can prevent foreign matter from entering the wedge space.

Also in the present invention, the following arrangement may be included as shown in FIG. 11A and FIG. 11B, or FIG. 25A through 25F, for example. That is, a plurality of projections 62 extending axially are provided circumferentially at intervals on at least one of either the inner or outer periphery of the elastic sleeve 12, the inner or outer periphery of the wedge member 15, the outer periphery of the central pillar 11, or the engaging hole 3.

In the present invention, it is preferable that the engaging hole 3 is formed as a substantially circular straight hole, while the outer peripheral surface 12a of the engaging member 12 is formed as a substantially circular straight surface as shown in FIG. 3A and FIG. 3B, or FIG. 20A and FIG. 20B, for example.

Since the engaging member and the engaging hole can be processed easily, this invention shows a high versatility.

Also in the present invention, the engaging hole 3 may be formed as a substantially circular tapered hole which narrows inward, while the outer peripheral surface 12a of the engaging member 12 may be formed as a tapered surface which narrows toward the leading end as shown in FIG. 17, for example.

This invention facilitates the fitting as well as releasing operation for the engaging member and the engaging hole, and further exhibits the effect that there is a high tolerance to center deviations between them.

In the present invention, the following arrangement may be further included.

As shown in FIG. 17 or 32, for example, the engaging hole 3 and a clamping hole 81 are provided in the second block 2 inward in the recited order, another engaging member 84, which engages with the clamping hole 81, being supported onto the central pillar 11, and wherein a rod 87 for engaging the engaging member 84 with the clamping hole 81 to be pulled toward the base end is inserted into a cylindrical hole 85 of the central pillar 11 to be connected to a clamp driving means 96.

This invention allows the rod to press the second block against the first block through the engaging member and the clamping hole, allowing a positioning apparatus incorporating a strong clamping mechanism to be provided.

Also in the present invention, it is preferable that a supply port 97 for a cleaning pressure fluid is provided in the first block 1, and a discharge port 98 is opened in the leading end portion of the rod 87, the supply port 97 and the discharge port 98 being communicated with each other as shown in FIG. 17 or 32, for example.

This invention allows foreign matter attached to contact portions and/or fitting portions of the positioning apparatus to be blown off by the above-described pressure fluid, allowing for a reliable and highly accurate positioning.

BRIEF DESCRIPTION OF THE DRAWINGS

FIG. 3A is an enlarged view typically showing a substantial part in FIG. 2, illustrating the operation of the positioning apparatus in the released state, FIG. 3B is a cross-sectional view indicated by the arrow 3B—3B in FIG. 3A, showing a radially expansible mechanism provided in the positioning apparatus, and FIG. 3C is a cross-sectional view indicated by the arrow 3C—3C also in FIG. 3A;

FIG. 6A is a view similar to FIG. 3B, showing a first exemplary variation of the former radially expansible mechanism, and FIG. 6B is a view similar to FIG. 5, showing an exemplary variation of the latter radially expansible mechanism;

BEST MODE FOR CARRYING OUT THE INVENTION

The present invention will hereinafter be described in more detail in accordance with the accompanying drawings.

Figure 1:
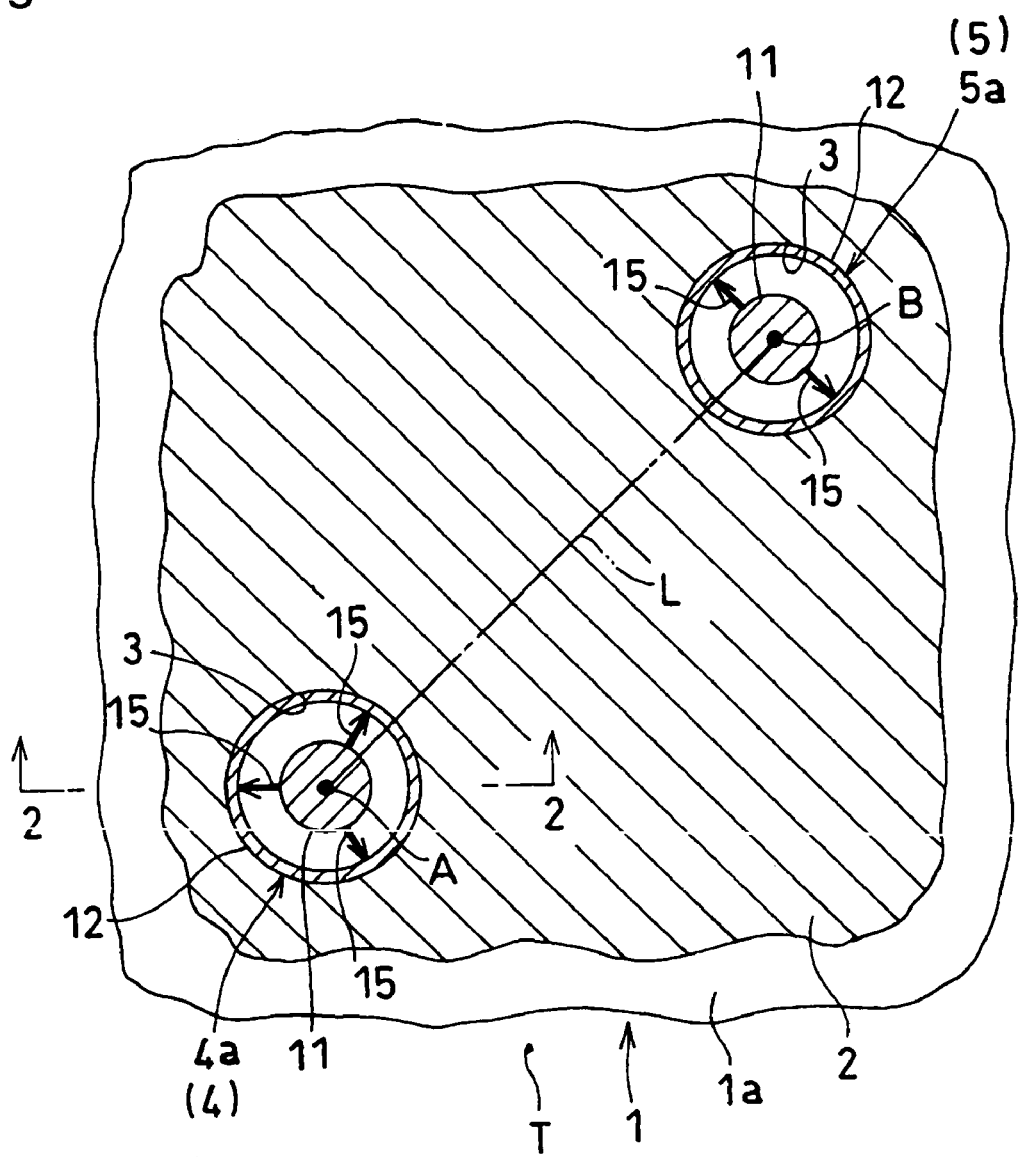
FIG. 1 is a view typically showing the basic principle of a pallet system utilizing the present invention as a positioning apparatus of a first embodiment according to the present invention, and particularly a horizontal cross-sectional view of the pallet system.
Figure 2:
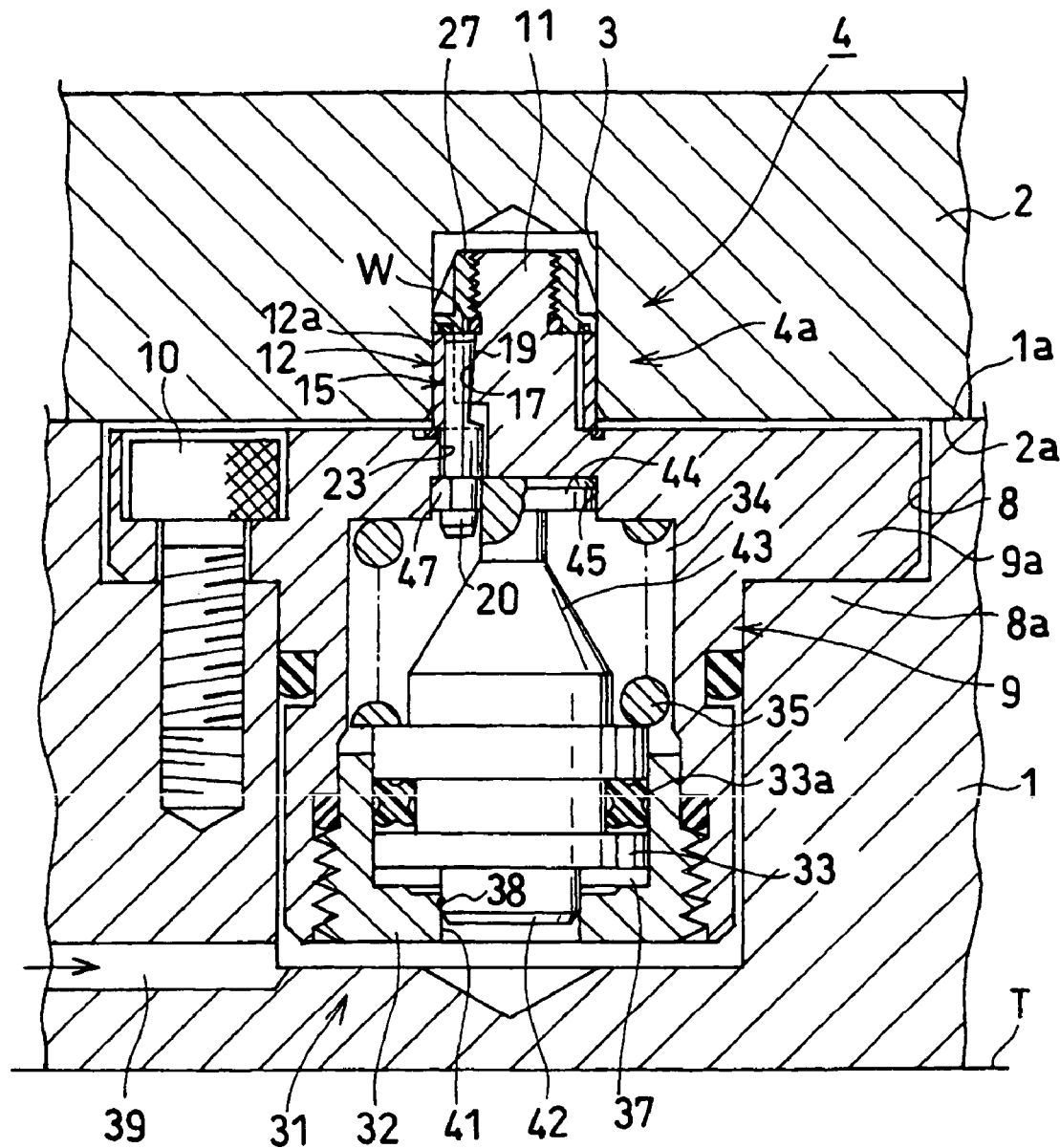
FIG. 2 is an elevational cross-sectional view of the positioning apparatus in a released state, corresponding to a view indicated by the arrow 2—2 in FIG. 1.

FIG. 1 through 5 show an example in which a positioning apparatus according to the present invention is applied to a pallet system as a first embodiment. The entire structure of the pallet system will first be described with reference to FIGS. 1 and 2. FIG. 1 is a view typically showing the basic principle of the pallet system, and particularly a horizontal cross-sectional view of the pallet system. Also, FIG. 2 is an elevational cross-sectional view of the positioning apparatus in a released state, corresponding to a view indicated by the arrow 2—2 in FIG. 1.

In this embodiment, a base plate 1 as a first block is placed on a table T of a machine tool, and it is arranged that a surface 2a to be supported of a work pallet 2 as a second block is supported onto a support surface 1a of the base plate 1, and that the work pallet 2 is aligned to the base plate 1.

In the surface 2a to be supported of the work pallet 2 are opened a plurality of precisely processed engaging holes 3. There are formed two circular straight holes here as the engaging holes 3. In the base plate 1 are provided a plug means 4 corresponding to one of the engaging holes 3 and another plug means 5 corresponding to the other engaging hole 3. These two plug means 4 and 5 have the same structure except for radially expansible mechanisms 4a and 5a to be described hereinafter.

The plug means 4 and 5 are arranged as follows.

In the support surface 1a of the base plate 1 is formed a stepped installation hole 8, a housing 9 being fitted into the installation hole 8 precisely, and the flange 9a of the housing 9 is fixed to the stepped portion 8a of the installation hole 8 using a plurality of tightening bolts 10. A central pillar 11 is projected from the housing 9 upward (toward the leading end) higher than the support surface 1a to be allowed to be inserted into the engaging hole 3. Here, the central pillar 11 is formed integrally with the housing 9, the axial center of the central pillar 11 being aligned to that of the installation hole 8 precisely.

An elastic sleeve (engaging member) 12 is supported onto the base plate 1 in the outer peripheral space of the central pillar 11. The elastic sleeve 12, which is obtained here by hardening special alloy steel such as bearing steel and die steel, is composed of a thin-walled cylinder formed integrally in a circumferentially seamless manner. On the outer periphery of the elastic sleeve 12 is formed a straight outer peripheral surface 12a to be fitted into the engaging hole 3.

The radially expansible mechanism 4a of the plug means 4 is arranged in such a manner as to radially expand the elastic sleeve 12 against the central pillar 11 by the wedge action in, for example, three directions in FIG. 1 to bring the three circumferential portions of the elastic sleeve 12 into close contact with the engaging hole 3. Thus, the work pallet 2 is positioned horizontally against the base plate 1 through the central pillar 11, a wedge member 15 to be described hereinafter, and the elastic sleeve 12 in the recited order.

Also as shown in FIG. 1, the radially expansible mechanism 5a of the plug means 5 is arranged in such a manner as to radially expand the elastic sleeve 12 by the wedge action in two directions substantially perpendicular to a straight line L for connecting the axial centers A and B of the respective two central pillars 11 to bring the two circumferential portions of the elastic sleeve 12 into close contact with the engaging hole 3. This prevents the work pallet 2 from rotating centering on the axial center A.

The specific structure of the plug means 4 and 5 will hereinafter be described by FIG. 3A through FIG. 5 with reference to FIG. 2. It is noted that since the two plug means 4 and 5 have the same structure except for the radially expansible mechanisms 4a and 5a as mentioned above, the description will be given only for the plug means 4.

Figure 4B:
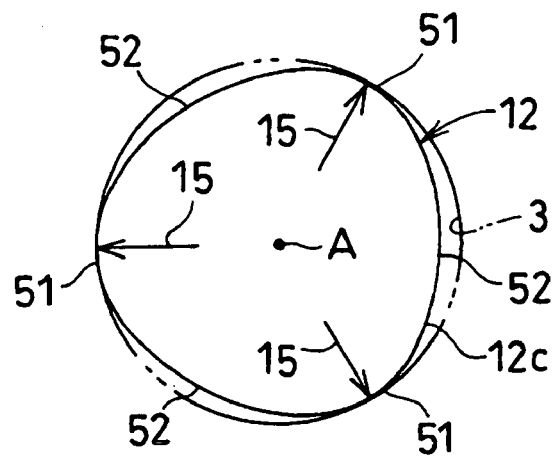
FIG. 4B is a typical view indicated by the arrow 4B—4B in FIG. 4A.
Figure 4A:
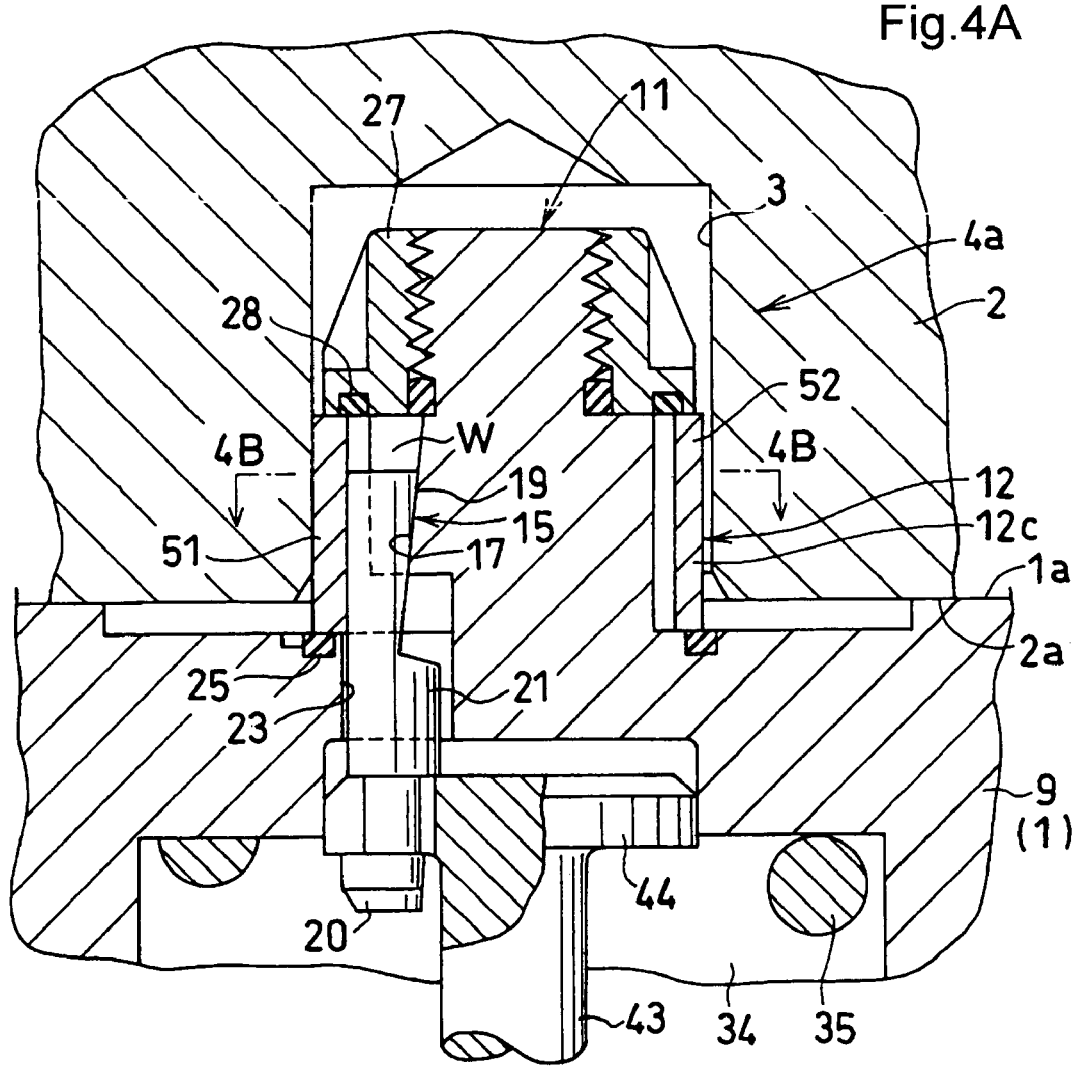
FIG. 4A is a view similar to FIG. 3A, illustrating the operation of the positioning apparatus in a locked state.
Figure 5:
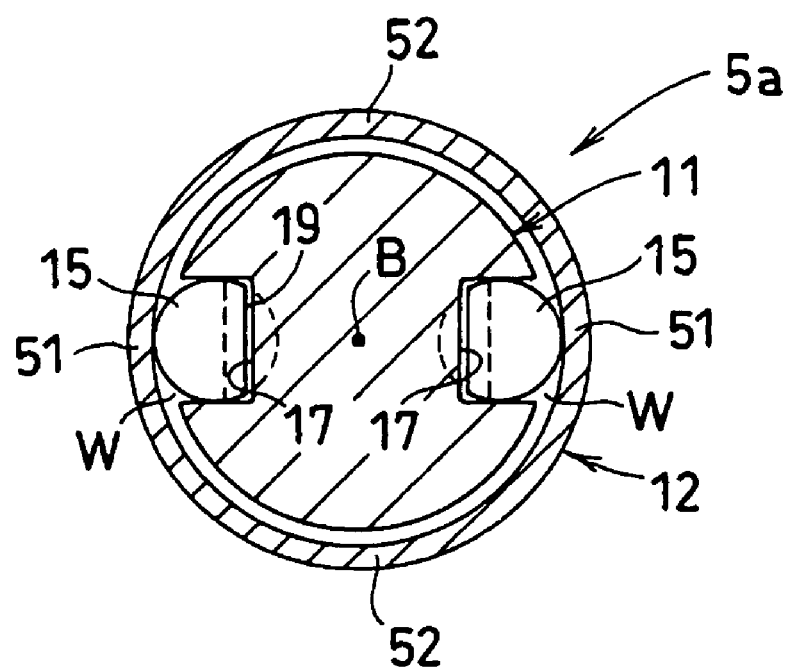
FIG. 5 is a view similar to FIG. 3B, showing a horizontal cross section of another radially expansible mechanism provided in the pallet system.

FIG. 3A is an enlarged view typically showing a substantial part in FIG. 2, illustrating the operation of the positioning apparatus in a released state. FIG. 3B is a cross-sectional view indicated by the arrow 3B—3B in FIG. 3A, showing the radially expansible mechanism 4a. FIG. 3C is a cross-sectional view indicated by the arrow 3C—3C also in FIG. 3A. FIG. 4A is a view similar to FIG. 3A, illustrating the operation of the positioning apparatus in a locked state. FIG. 4B is a typical view indicated by the arrow 4B—4B in FIG. 4A. FIG. 5 is a view similar to FIG. 3B, showing a horizontal cross section of the radially expansible mechanism 5a.

Between the central pillar 11 and the elastic sleeve 12 are arranged three wedge spaces W circumferentially at predetermined intervals. The wedge spaces W are formed in such a manner as to narrow downward (toward the base end), a wedge member 15 being inserted into each of the wedge spaces W vertically movably.

In more detail, on the outer periphery of the central pillar 11 are formed three inclined grooves 17 circumferentially at substantially the same intervals. The inclined grooves 17 are inclined upward to be close to the axial center A. The wedge spaces W are formed between the respective inclined grooves 17 and the inner peripheral surface 12b of the elastic sleeve 12. The wedge members 15 are obtained by cutting circular pins, in the upper half portion of each of the wedge members 15 being formed a wedge surface 19 to be engaged with the respective inclined grooves 17. Also, in the lower part of each of the wedge members 15 is formed an input portion 20. Further, the intermediate portion 21 of each of the wedge members 15 is fitted into a vertical hole 23 in the upper wall of the housing 9 to be guided radially movably along the vertical hole 23.

It is noted that the radially expansible mechanism 5a of the plug means 5 is different relative to the plug means 4 in that two inclined grooves 17 are arranged in the central pillar 11 facing each other as shown in FIG. 5.

On the outer periphery of a plurality of the vertical holes 23 and in the upper surface of the housing 9 is formed an annular groove 24. The lower end surface (base end surface) of the elastic sleeve 12 is supported onto a supporting portion 9b in the upper part of the housing 9 radially movably and hermetically through a first O-ring sealing member 25 disposed in the annular groove 24. It is noted that a relief groove 26 is communicated in a circumferential part of the annular groove 24, the relief groove 26 facing a relief portion 25a of the first sealing member 25. In addition, a cap (ceiling wall) 27 for covering the upper part of the three wedge spaces W is fixed to the upper end of the central pillar 11 hermetically with screws. Then, the upper end surface (leading end surface) of the elastic sleeve 12 is supported onto the cap 27 radially movably and hermetically through a second O-ring sealing member 28 fitted to the lower surface of the cap 27.

In the housing 9 is provided a driving means 31 for moving a plurality of the wedge members 15 vertically. That is, in the lower part of the housing 9 is fixed a male screw cylinder 32 adjustably forward and backward with screws, and a piston 33 is inserted into the cylindrical hole of the male screw cylinder 32. In a lock chamber 34 formed over the piston 33 is disposed a lock spring 35 composed of a compressed coil spring. Also, a release chamber 37 formed below the piston 33 is connected to a pressurized oil supply and discharge port 39 through a restricting passage 38. The restricting passage 38 is formed as a fitting gap between a lower guide hole 41 of the male screw cylinder 32 and a lower rod 42 of the piston 33. In the upper part of an upper rod 43 of the piston 33 is provided a disk-like output portion 44 to be fitted into an upper guide hole 45 of the housing 9. In the output portion 44 are formed three guide grooves 47 extended radially, and the input portion 20 of each of the wedge members 15 is to be fitted into each of the guide grooves 47 radially movably and vertically unmovably.

The positioning apparatus arranged as above operates as follows.

In the released state as shown in FIG. 2 and FIG. 3A, pressurized oil is supplied to the release chamber 37. Thus, the piston 33 moves the output portion 44 up against the urging force of the lock spring 35, and then the output portion 44 moves the wedge members 15 up to allow the elastic sleeve 12 to be switched to a radially contracted state by its own elastic restoration force.

When positioning the work pallet 2 in the base plate 1, the work pallet 2 is first moved down in the released state, as shown in FIG. 3A, to fit the engaging hole 3 to the outer peripheral surface 12a of the elastic sleeve 12.

Next, the pressurized oil in the release chamber 37 is discharged. Then, the piston 33 comes down due to the urging force of the lock spring 35, which moves the three wedge members 15 down strongly through the output portion 44. Thus, each of the wedge members 15 is forced radially outward strongly in accordance with the wedge engagement between the wedge surface 19 and the inclined groove 17 as shown in FIG. 4A. Consequently, three radially expandible portions 51 in an annular wall 12c of the elastic sleeve 12, which are arranged circumferentially at intervals, are deformed elastically radially outward, as shown in the typical view FIG. 4B, to be brought into close contact with the engaging hole 3. Afterward, a clamping means (not shown in the figure) presses the work pallet 2 strongly against the base plate 1.

Incidentally, in the radially contracted state of the elastic sleeve 12, the fitting gap E between the outer peripheral surface 12a and the engaging hole 3 is set to a small value of approximately 0.02 to 0.06 mm if the diameter of the engaging hole 3 is approximately 10 mm, for example. Then, in the locking operation, the radially expandible portions 51 are projected radially outward with a larger value than the fitting gap E, and a radially contracted portion 52 between adjacent radially expandible portions 51 is retreated radially inward.

In the locking operation, the pressurized oil in the release chamber 37 is discharged gradually by the action of the restricting passage 38, which allows the locking operation to be performed gradually and reliably.

In addition, since the lower rod 42 of the driving means 31 is adapted to be guided by the lower guide hole 41, while the output portion 44 by the upper guide hole 45, the piston 33 can be driven in a straight manner. Further, since the lower part of each of the wedge members 15 is adapted to be guided by the vertical hole 23, while the upper half portion of each of the wedge members 15 by the bottom wall and the both side walls of each of the inclined grooves 17, the wedge members 15 can be moved with a high degree of accuracy.

When switching from the locked state to the released state, it is only required to first release the clamped state of the clamping means (not shown in the figure), and then supply pressurized oil to the release chamber 37 as mentioned above. Thus, the wedge members 15 are moved up, and then the radially expandible portions 51 of the elastic sleeve 12 are contracted radially by their own elastic restoration force, whereby the locked state is to be released. Afterward, the work pallet 2 is to be moved up.

If the fixing force of the elastic sleeve 12 is set to a sufficiently high value in the locking operation, the clamping means (not shown in the figure) can be omitted.

Meanwhile, if the sealing member 33a of the piston 33 is damaged, the pressurized oil in the release chamber 37 leaks into the lock chamber 34, and a large amount of oil is to be accumulated in the lock chamber 34 increasingly. Then, the leakage oil in the lock chamber 34 is discharged to the outside by pushing the relief portion 25a of the first sealing member 25 open when the lock chamber 34 is contracted to increase the pressure therein. Consequently, the piston 33 can be prevented from becoming unmovable caused by the leakage oil in the lock chamber 34.

It is noted that the gradient of the inclined grooves 17 of the central pillar 11 is preferably 3 to 10 degrees, and more preferably 5 to 8 degrees, being set to 6 degrees in the first embodiment. Although the diameter of the engaging hole 3 has been set to 10 mm as an example, a small positioning apparatus with a diameter of even 6 mm or less can be manufactured, while a large positioning apparatus with a diameter of even 20 mm or more can also be manufactured.

It is noted that the central pillar 11 is only required to be fixed to the base plate 1. Therefore, the central pillar 11 may be fixed to the housing 9 through a tightening means such as a screw engagement or a flange connection instead of being formed integrally with the housing 9.

On the outer periphery of the central pillar 11 may be provided a plurality of inclined surfaces instead of a plurality of the inclined grooves 17 presented as an example.

Also, the lock spring 35 may be composed of a coned disc spring, etc., instead of the coil spring presented as an example.

Further, the support surface 1a may be provided in the upper surface of the flange 9a of the housing 9 instead of being provided in the base plate 1. The base plate 1 and the housing 9 may be formed integrally instead of being formed separately.

The structure of the relief portion 25a presented as an example to discharge leakage oil accumulated in the lock chamber 34 to the outside may be arranged to have a specific sealing member instead of being provided as the first sealing member 25, and further may be replaced with a poppet type check valve, etc.

It is preferable that a cleaning means is provided in the positioning apparatus to clean contact portions between the support surface 1a and the surface 2a to be supported and fitting portions between the engaging hole 3 and the elastic sleeve 12 with pressure fluid such as compressed air.

In the positioning apparatus may also be provided a seating confirmation means. For example, in the support surface 1a is opened a detection nozzle hole (not shown in the figure) to supply compressed air for detection thereinto. Then, when the surface 2a to be supported is brought into contact with the support surface 1a, the pressure in the detection nozzle hole increases. It can be confirmed that the work pallet 2 is seated on the base plate 1 by detecting the increase in the pressure using a pressure switch, etc.

FIGS. 6A, 6B, 7, 8, 9A, 9B, 10A, 10B, 11A, and 11B show exemplary variations of the first embodiment. In these exemplary variations, components similar to those of the first embodiment will be designated and described by the same numerals as a general rule.

FIG. 6A is a view similar to FIG. 3B, showing a first exemplary variation of the radially expansible mechanism 4a. In this case, the outer peripheral surface of the central pillar 11 is composed of a tapered surface 55 which narrows upward, while the wedge space W is formed in an annular shape when viewed from above. Into the wedge space W are inserted three wedge members 15 circumferentially at substantially the same intervals. It is noted that the tapered surface 55 is formed at a tapering angle of approximately 12 degrees (at a gradient of approximately 6 degrees).

FIG. 6B is a view similar to FIG. 5, showing an exemplary variation of the radially expansible mechanism 5a. The exemplary variation shown in FIG. 6B is different from that shown in FIG. 6A in that two wedge members 15 are arranged facing each other.

Figure 7:
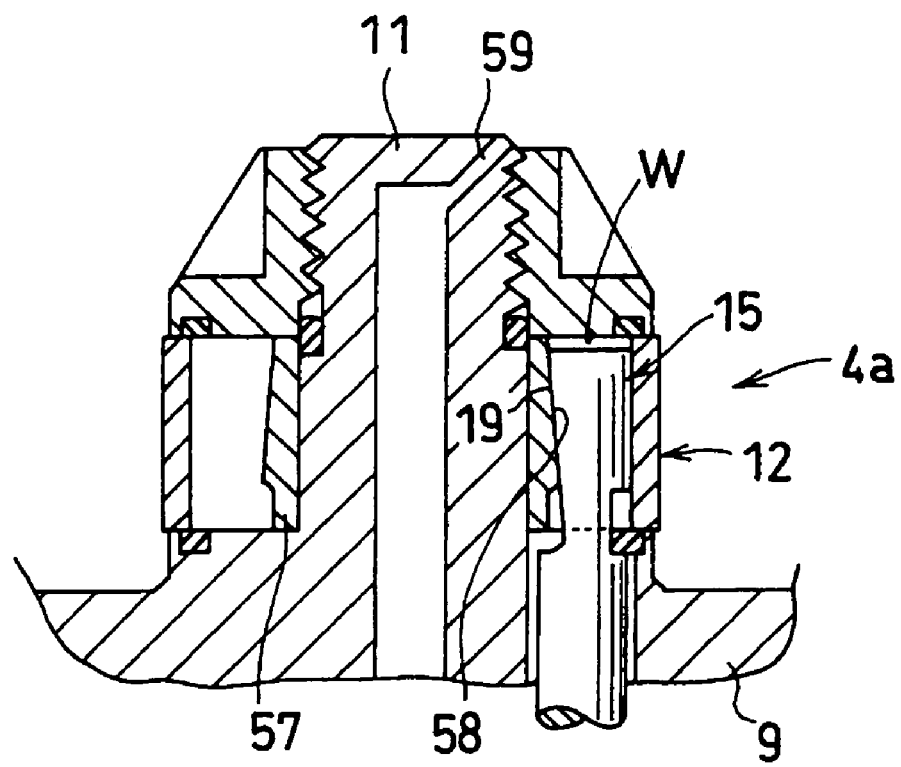
FIG. 7 is a partial view similar to FIG. 3A, showing a second exemplary variation of the former radially expansible mechanism.

FIG. 7 is a partial view similar to FIG. 3A, showing a second exemplary variation of the radially expansible mechanism 4a. In this case, a tapered bush 57 is fitted onto the straight outer peripheral surface of the central pillar 11. Between a tapered surface 58 on the outer periphery of the bush 57 and the elastic sleeve 12 is formed an annular wedge space W which narrows downward. The bush 57 may be manufactured in a circumferentially seamless manner, or in such a manner that a slit or a groove extending vertically is provided in the peripheral wall.

It is noted that in the upper end of the central pillar 11 is opened a breather hole 59 communicated with the lock chamber (not shown in the figure here).

Figure 8:
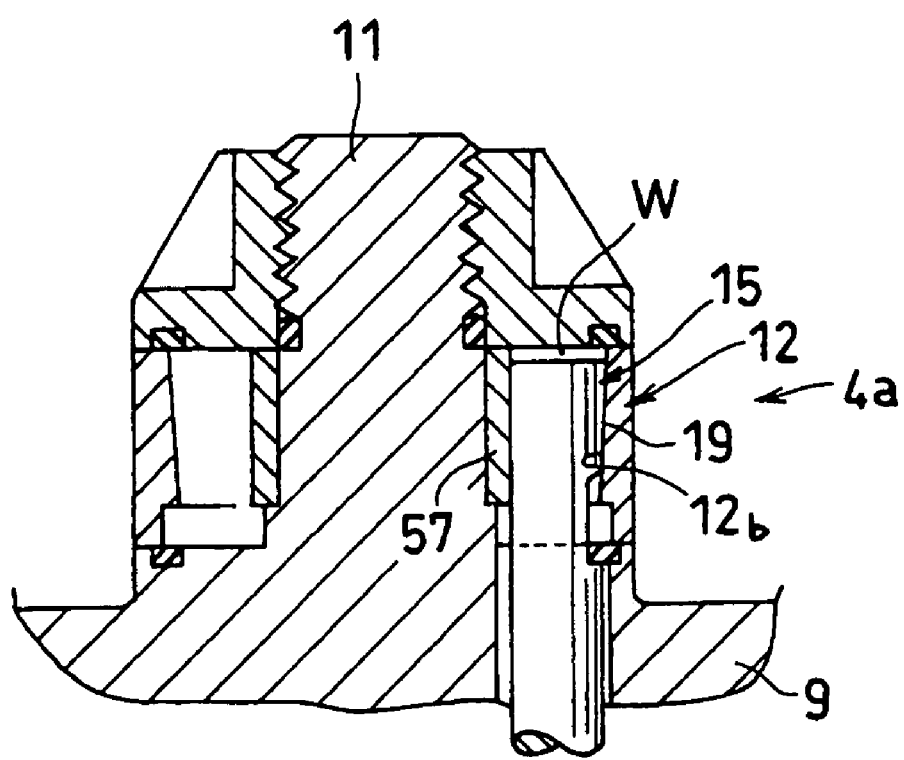
FIG. 8 is a view similar to FIG. 7, showing a third exemplary variation of the former radially expansible mechanism.

FIG. 8 is a view similar to FIG. 7, showing a third exemplary variation of the radially expansible mechanism 4a. The exemplary variation shown in FIG. 8 is different from that shown in FIG. 7 in the following points. The outer peripheral surface of the bush 57 is formed in a straight manner, while the inner peripheral surface 12b of the elastic sleeve 12 is composed of a tapered surface which narrows downward. Then, a wedge surface 19 formed radially outward of the wedge member 15 is formed in a circular arc shape, when viewed from above, so as to follow the shape of the inner peripheral surface 12b.

Figure 9B:
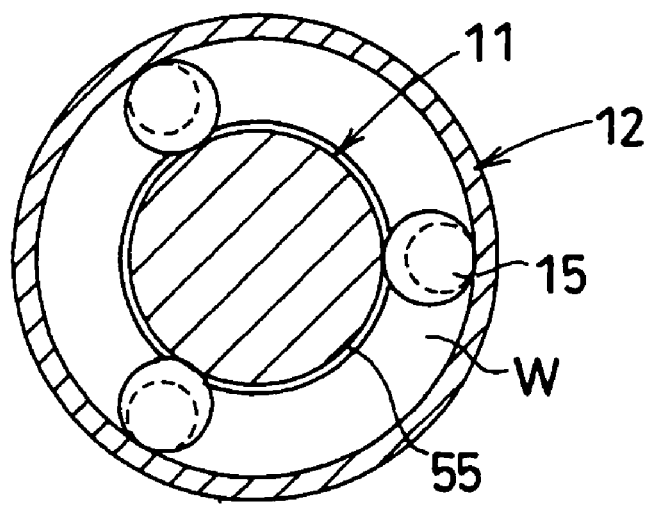
FIG. 9B is a view similar to FIG. 6A, showing a horizontal cross section of the fourth exemplary variation.
Figure 9A:
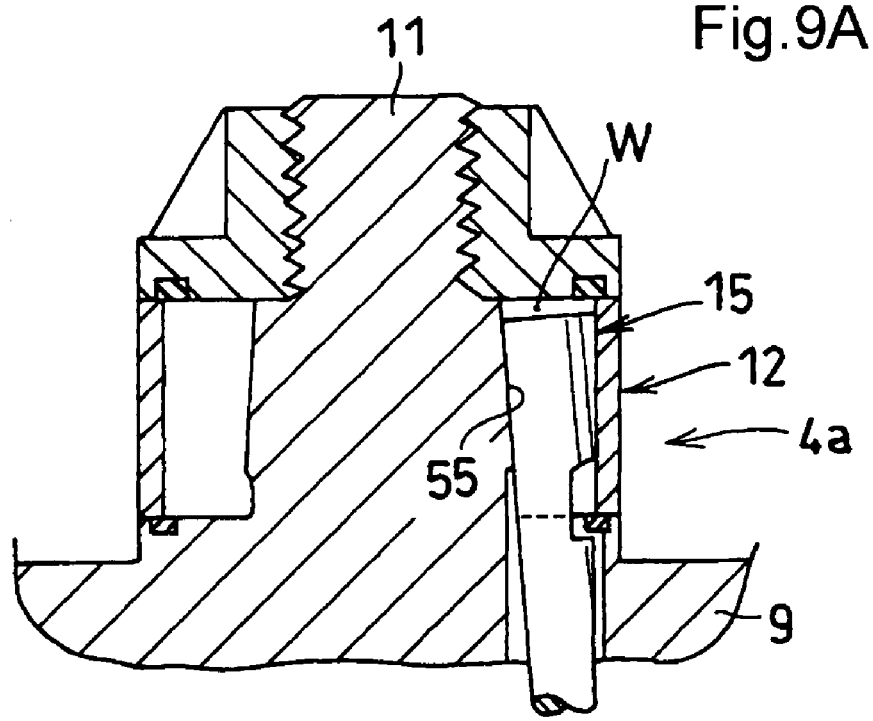
FIG. 9A is a view similar to FIG. 7, showing a fourth exemplary variation of the former radially expansible mechanism.

FIG. 9A and FIG. 9B show a fourth exemplary variation of the radially expansible mechanism 4a. FIG. 9A is similar to FIG. 7, while FIG. 9B is similar to FIG. 6A. The fourth exemplary variation is different from that shown in FIG. 7 in that the bush 57 shown in FIG. 7 is omitted, and that a tapered surface 55 is formed on the outer periphery of the central pillar 11, and further that the axial center of the wedge members 15 is inclined.

Figure 10B:
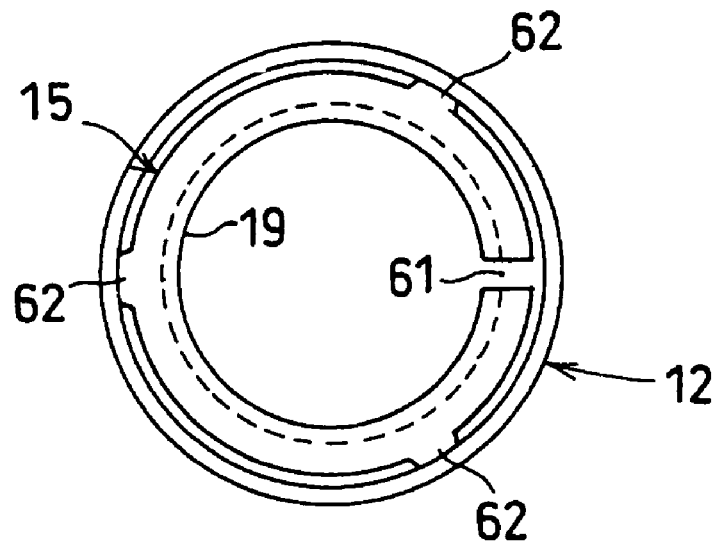
FIG. 10B is a view similar to FIG. 3B, showing part of the fifth exemplary variation when viewed from above.
Figure 10A:
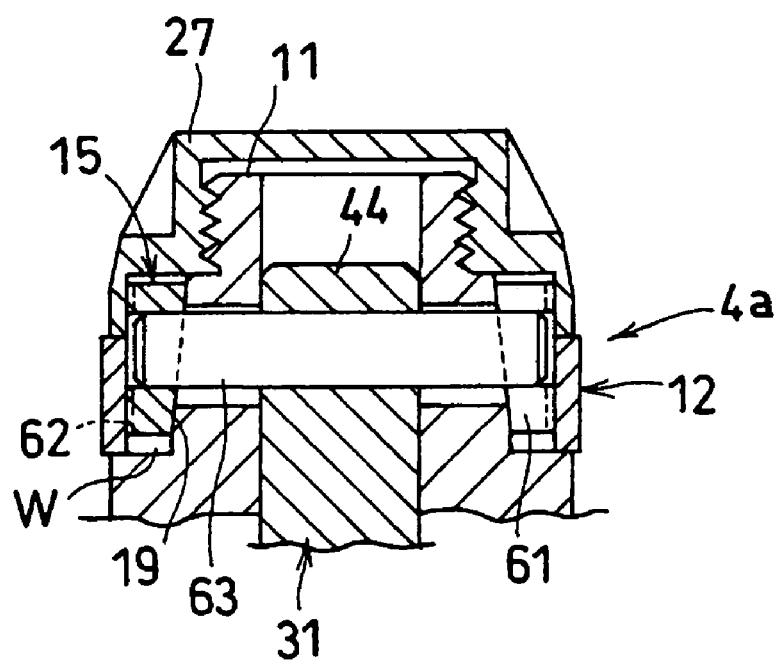
FIG. 10A is a view similar to FIG. 7, showing a fifth exemplary variation of the former radially expansible mechanism.

FIG. 10A and FIG. 10B show a fifth exemplary variation of the radially expansible mechanism 4*a*. FIG. 10A is similar to FIG. 7. FIG. 10B is a view similar to FIG. 3B, showing part of FIG. 10A when viewed from above.

In the case above, the wedge members 15 are formed as an annular collet. Here, in a part of the peripheral wall of the wedge member 15 is formed a slit 61, which allows the peripheral wall to be expanded and contracted radially. In the inner peripheral surface of the wedge member 15 is formed a wedge surface 19 extending circumferentially. Also, in the outer peripheral surface of the wedge member 15 are provided three projections 62 for radial expansion, which extend vertically, circumferentially at substantially the same intervals. Then, the central pillar 11 is formed in a cylindrical shape, the output portion 44 inserted in the central pillar 11 and the collet-type wedge member 15 being connected to each other through a connecting pin 63.

Figure 11B:
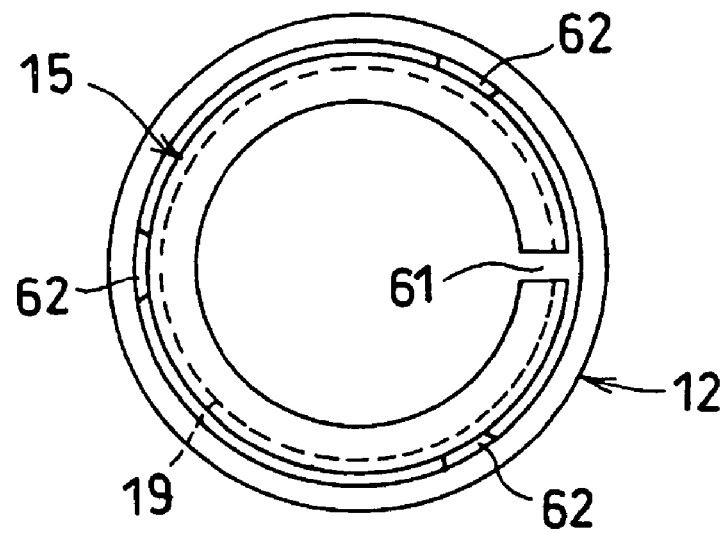
FIG. 11B is a view similar to FIG. 10B, showing part of the sixth exemplary variation when viewed from above.
Figure 11A:
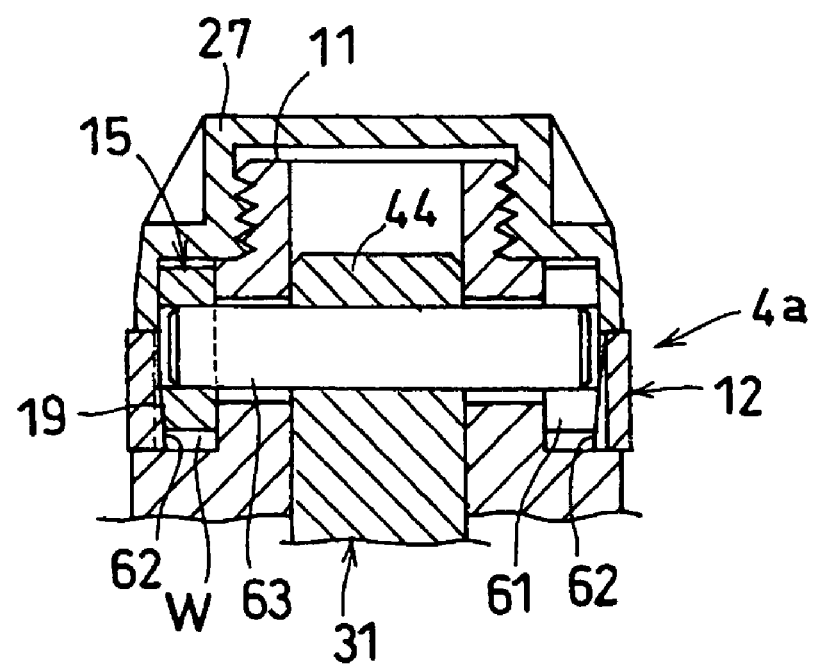
FIG. 11A is a view similar to FIG. 10A, showing a sixth exemplary variation of the former radially expansible mechanism.

FIG. 11A and FIG. 11B show a sixth exemplary variation of the radially expansible mechanism 4*a*. FIG. 11A is similar to FIG. 10A, while FIG. 11B to FIG. 10B. The sixth exemplary variation is different from the fifth exemplary variation in the following points.

On the inner periphery of the elastic sleeve 12 are provided three projections 62 for radial expansion, which extend vertically, circumferentially at substantially the same intervals. The inner periphery of the projections 62 is inclined downward, and the wedge surface 19 is formed in the lower half portion of the outer peripheral surface of the collet-type wedge member 15.

FIGS. 12, 13, 14, 17, 19 through 21, 23, 24, 26A through 28, 30, 31, and 32 show second through twelfth embodiments respectively. Also in these embodiments, components similar to those of the first embodiment will be designated by the same numerals as a general rule.

Figure 12:
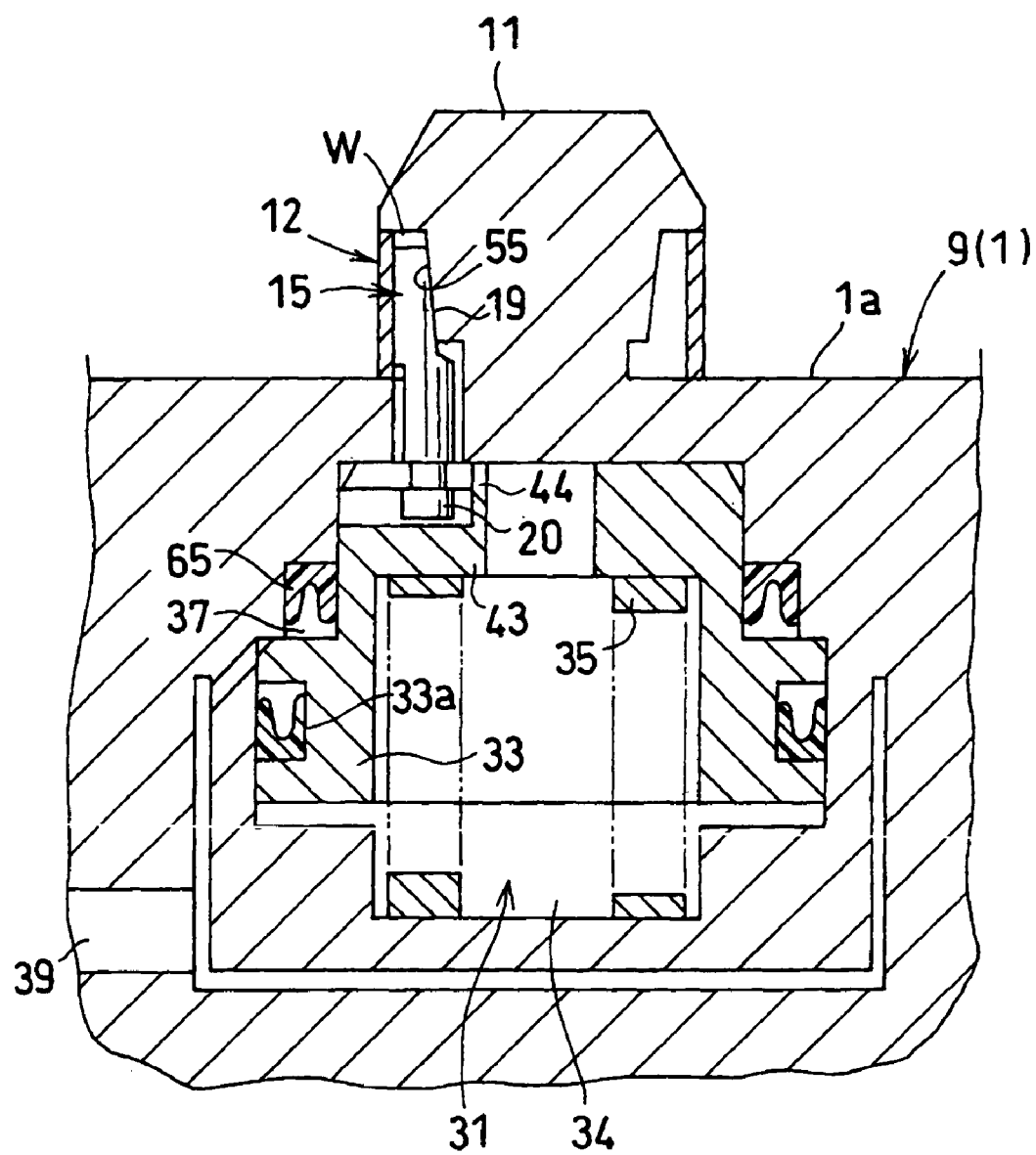
FIG. 12 is a view similar to FIG. 3A, showing a positioning apparatus of a second embodiment according to the present invention.

FIG. 12 is a view similar to FIG. 3A, showing the second embodiment. In this case, the wedge spaces W and the wedge members 15 are formed in such a manner as to narrow upward (toward the leading end). The lock chamber 34 is formed under the piston 33. The lower part of an upper rod 43 projected upward from the piston 33 is sealed by means of a packing 65, and the release chamber 37 is formed on the outer periphery of the upper rod 43. Then, in a locking operation, the piston 33 is driven upward by the lock spring 35 provided in the lock chamber 34. Then, the output portion 44 provided in the upper part of the upper rod 43 moves the plurality of wedge members 15 upward, and the wedge members 15 expand the elastic sleeve 12 radially.

It is noted that in the outer peripheral surface of the central pillar 11 may be arranged inclined grooves, which are inclined downward, circumferentially at substantially the same intervals instead of being formed a tapered surface 55 which narrow downward, as shown in the figure.

Figure 13:
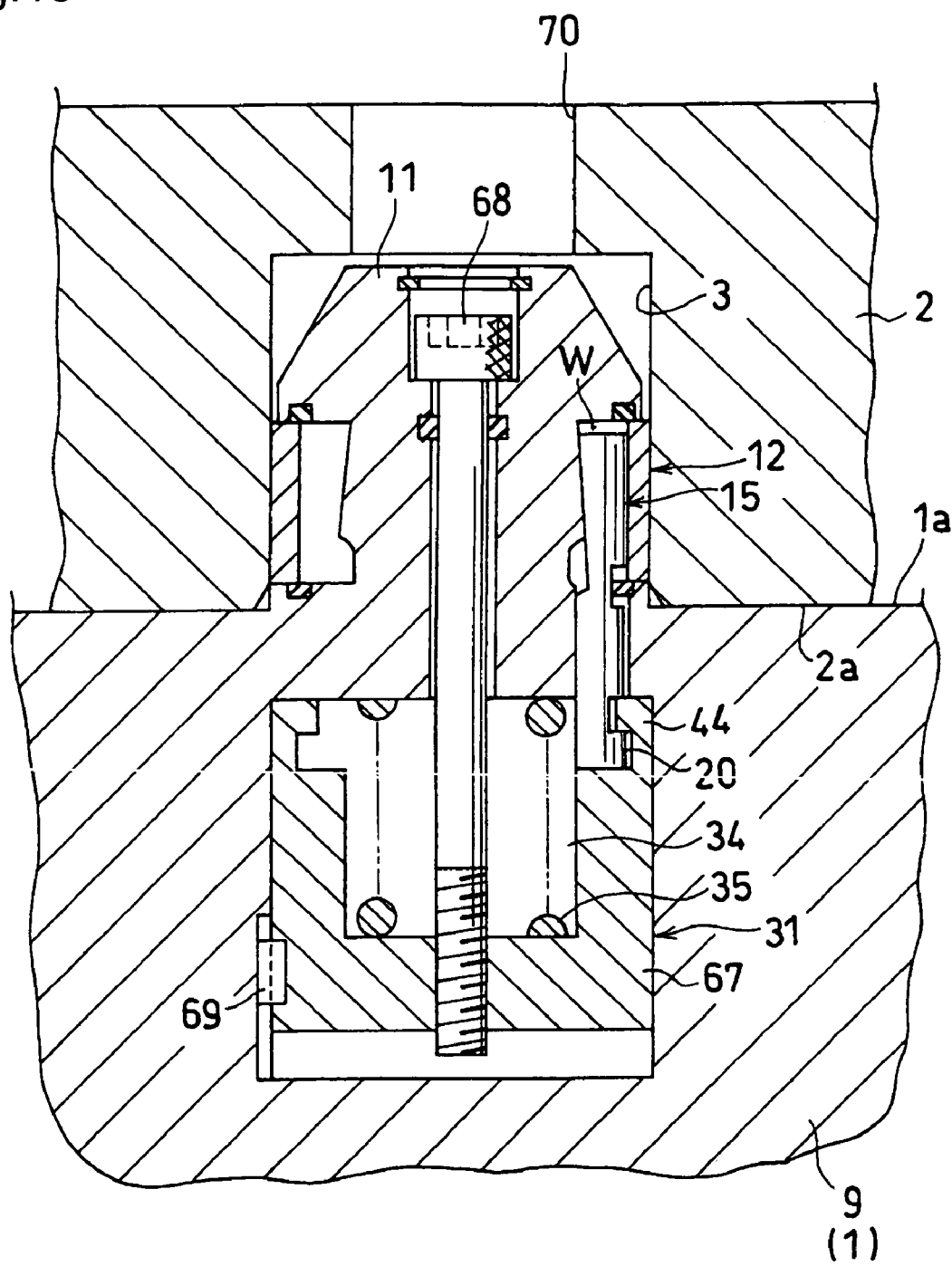
FIG. 13 is a view similar to FIG. 3A, showing a positioning apparatus of a third embodiment according to the present invention.

FIG. 13 is a view similar to FIG. 3A, showing the third embodiment. In this case, the driving means 31 comprises a spring support 67 inserted in the housing 9 of the base plate 1, an operation bolt 68 supported in the central pillar 11 rotatably and screwed into the spring support 67, and the lock spring 35 for urging the spring support 67 downward. The spring support 67 is prevented from rotating centering on the axial center thereof by means of a pin 69.

In the released state shown in the figure, the operation bolt 68 is rotated and tightened using a hexagonal wrench (not shown in the figure) inserted in an operation hole 70 of the work pallet 2. Thus, the spring support 67 is moved up against the lock spring 35, and the wedge members 15 are moved upward to be released by the output portion 44 provided in the upper part of the spring support 67. When switching from the released state to a locked state, the operation bolt 68 is rotated and loosened. Then, the spring support 67 is moved down due to the lock spring 35, and the wedge members 15 are moved downward to be locked by the output portion 44.

Figure 14:
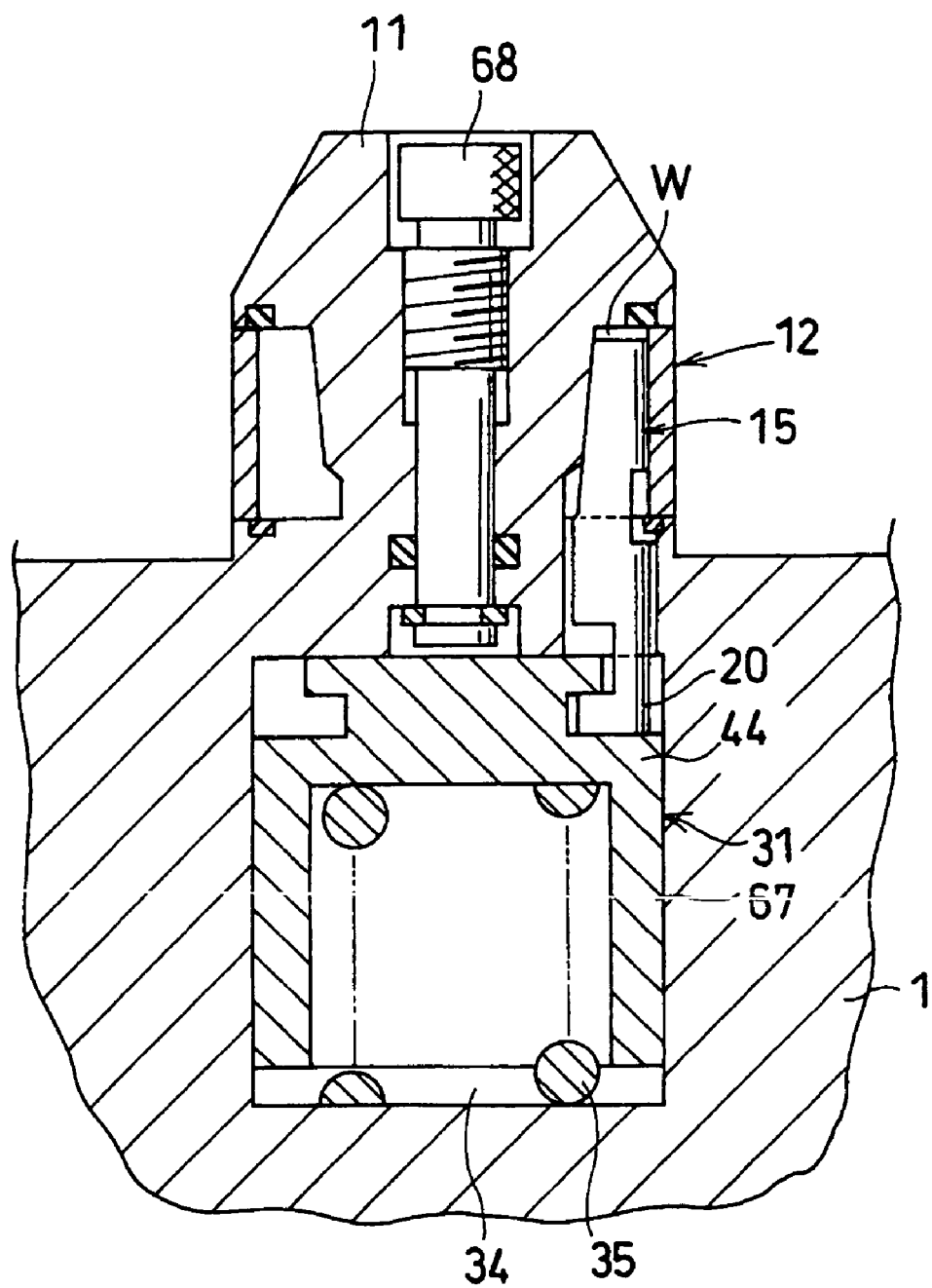
FIG. 14 is a view similar to FIG. 13, showing a positioning apparatus of a fourth embodiment according to the present invention.

FIG. 14 is a view similar to FIG. 13, showing the fourth embodiment. The fourth embodiment is different from that shown in FIG. 13 in the following points.

The operation bolt 68 is screwed into the central pillar 11. In the locked state shown in the figure, the operation bolt 68 is rotated and loosened to be retreated upward. Thus, the spring support 67 is moved up due to the lock spring 35, and the wedge members 15 are moved upward to be locked by the output portion 44. When switching from the locked state to a released state, the operation bolt 68 is rotated and tightened to be advanced downward. Then, the spring support 67 is moved down against the lock spring 35, and the wedge members 15 are moved downward to be released by the output portion 44.

FIG. 15A through FIG. 15F are partial views similar to FIG. 3A, showing, respectively, first through sixth exemplary variations of the positioning apparatus.

Figure 15A:
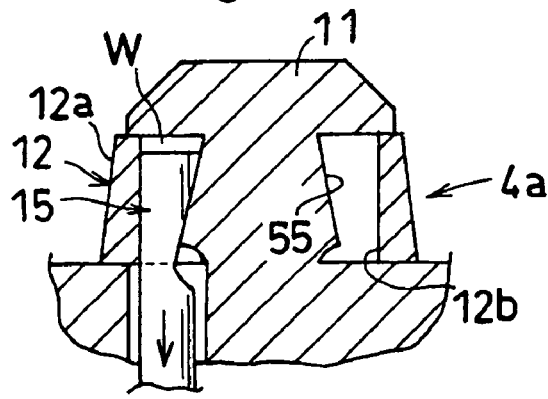
FIG. 15A through FIG. 15F are partial views similar to FIG. 3A, showing, respectively, first through sixth exemplary variations of the positioning apparatus.

In accordance with the first exemplary variation shown in FIG. 15A, the outer peripheral surface 12*a* of the elastic sleeve 12 is composed of a tapered surface which narrows upward, the tapered outer peripheral surface 12*a* being adapted to make a tapering engagement with the engaging hole (not shown in the figure). The tapered engaging hole is formed in such a manner as to narrow upward (inward). Between the straight inner peripheral surface 12*b* of the elastic sleeve 12 and the tapered surface 55 of the central pillar 11 is inserted a wedge member 15 which narrows downward. It is noted that the arrow shown in the figure indicates the direction of movement for locking.

Figure 15B:
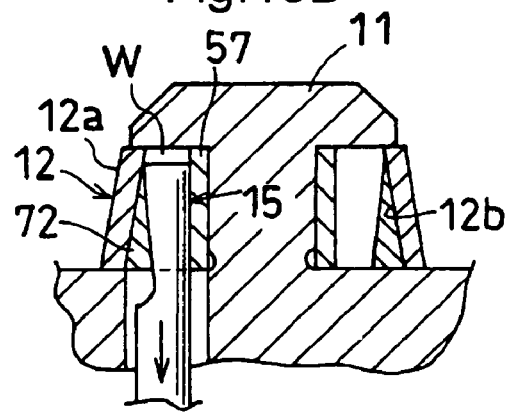

The second exemplary variation shown in FIG. 15B is obtained by arranging FIG. 15A in such a manner that a straight-type inner bush 57 is fitted onto the central pillar 11, the outer peripheral surface 12*a* and the inner peripheral surface 12*b* of the elastic sleeve 12 are both composed of a tapered surface which narrows upward, and an outer bush 72 is fitted into the tapered inner peripheral surface 12*b*. Between the outer bush 72 and the inner bush 57 is inserted a wedge member 15 which narrows downward.

It is noted that in the inner peripheral surface 12*b* of the elastic sleeve 12 may be provided a plurality of projections, which extend vertically (refer to FIG. 11A and FIG. 11B), circumferentially at intervals instead of being provided the outer bush 72.

Figure 15C:
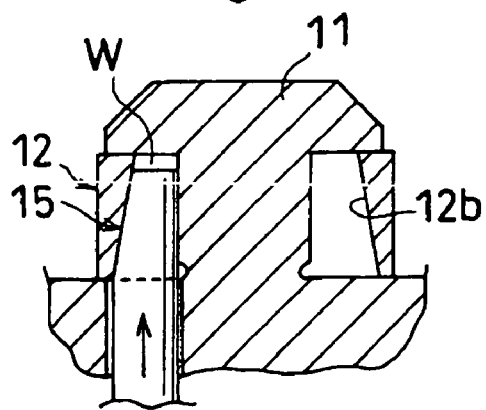

In accordance with the third exemplary variation shown in FIG. 15C, the inner peripheral surface 12*b* of the elastic sleeve 12 is composed of a tapered surface which narrows upward, and between the tapered inner peripheral surface 12*b* and the straight outer peripheral surface of the central pillar 11 is inserted a wedge member 15 which narrows upward. It is noted that the arrow shown in the figure indicates the direction of movement for locking.

Figure 15D:
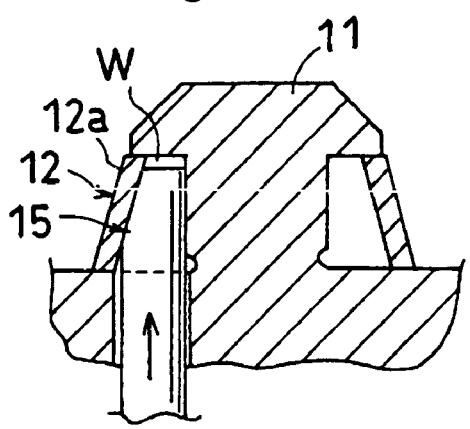

The fourth exemplary variation shown in FIG. 15D is obtained by arranging FIG. 15C in such a manner that the outer peripheral surface 12*a* of the elastic sleeve 12 is composed of a tapered surface which narrows upward.

Figure 15E:
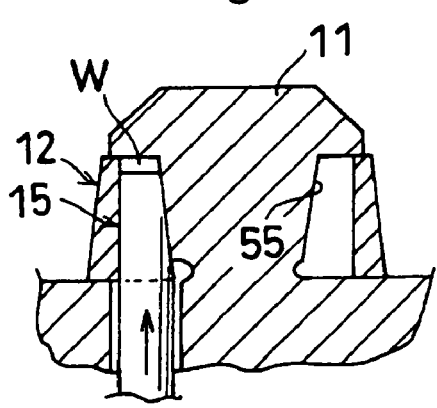

The fifth exemplary variation shown in FIG. 15E is obtained by arranging FIG. 15A in such a manner that the outer peripheral surface of the central pillar 11 is composed of a tapered surface 55 which narrows downward, and that the wedge member 15 is formed in such a manner as to narrow upward.

Figure 15F:
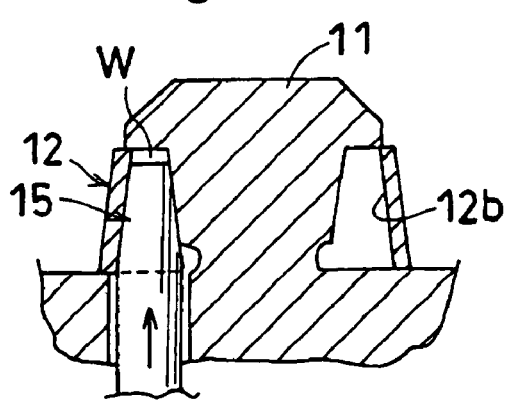

The sixth exemplary variation shown in FIG. 15F is obtained by arranging FIG. 15E in such a manner that the inner peripheral surface 12b of the elastic sleeve 12 is composed of a tapered surface which narrows upward, and that the upper part of the wedge member 15 is composed of a tapered surface which narrows upward.

Figure 16A:
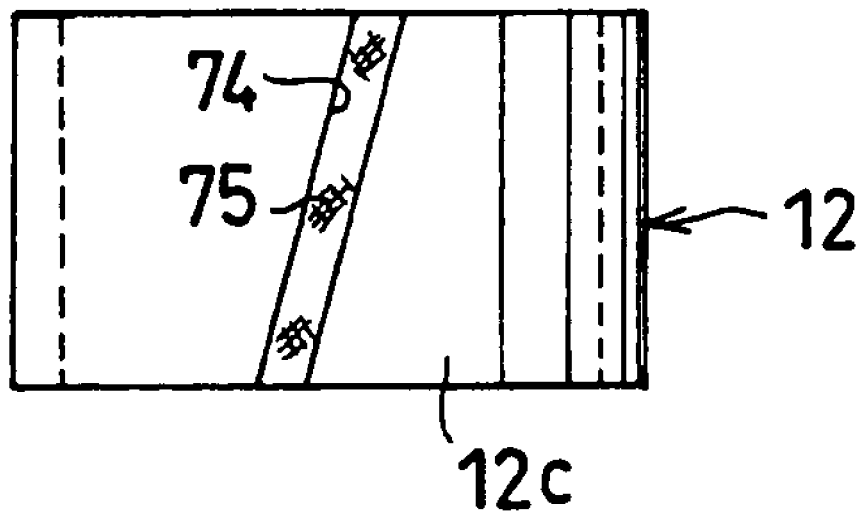
FIG. 16A and FIG. 16B are elevational views of, respectively, first and second exemplary variations of an elastic sleeve provided in the positioning apparatus.

FIG. 16A is an elevational view showing a first exemplary variation of the elastic sleeve 12. In this case, the elastic sleeve 12 is formed in a collet shape, and an inclined slit 74 is provided in the annular wall 12c, the annular wall 12c being adapted to be elastically deformable radially outward and to be restorable radially inward by its own elastic restoration force. The inclined slit 74 is filled or adhesively provided with an elastic sealing member 75 made of silicon rubber or synthetic resin, etc., which can prevent foreign matter such as dust and swarf from entering inside the collet-type elastic sleeve 12.

It is noted that the collet-type elastic sleeve 12 may comprise a vertically straight slit instead of the inclined slit 74 presented as an example. The elastic sealing member 75 may also be omitted.

Figure 16B:
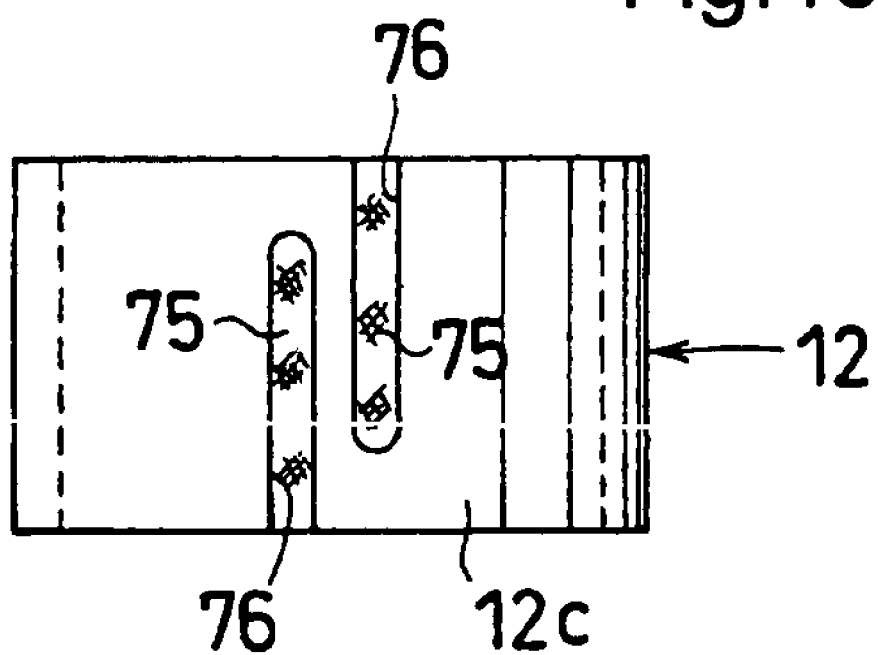

FIG. 16B is a view similar to FIG. 16A, showing a second exemplary variation of the elastic sleeve 12. The exemplary variation shown in FIG. 16B is different from that shown in FIG. 16A in that in the upper and lower parts are opened a pair of through grooves 76 instead of the slit 74, the elastic sealing member 75 being disposed in these through grooves 76. The elastic sealing member 75 may be omitted.

It is noted that a plurality set of the through grooves 76 are preferably provided in the elastic sleeve 12 circumferentially. Further, in at least one of either the inner peripheral surface or the outer peripheral surface of the elastic sleeve 12 may be recessed a groove instead of the through grooves 76.

Figure 17:
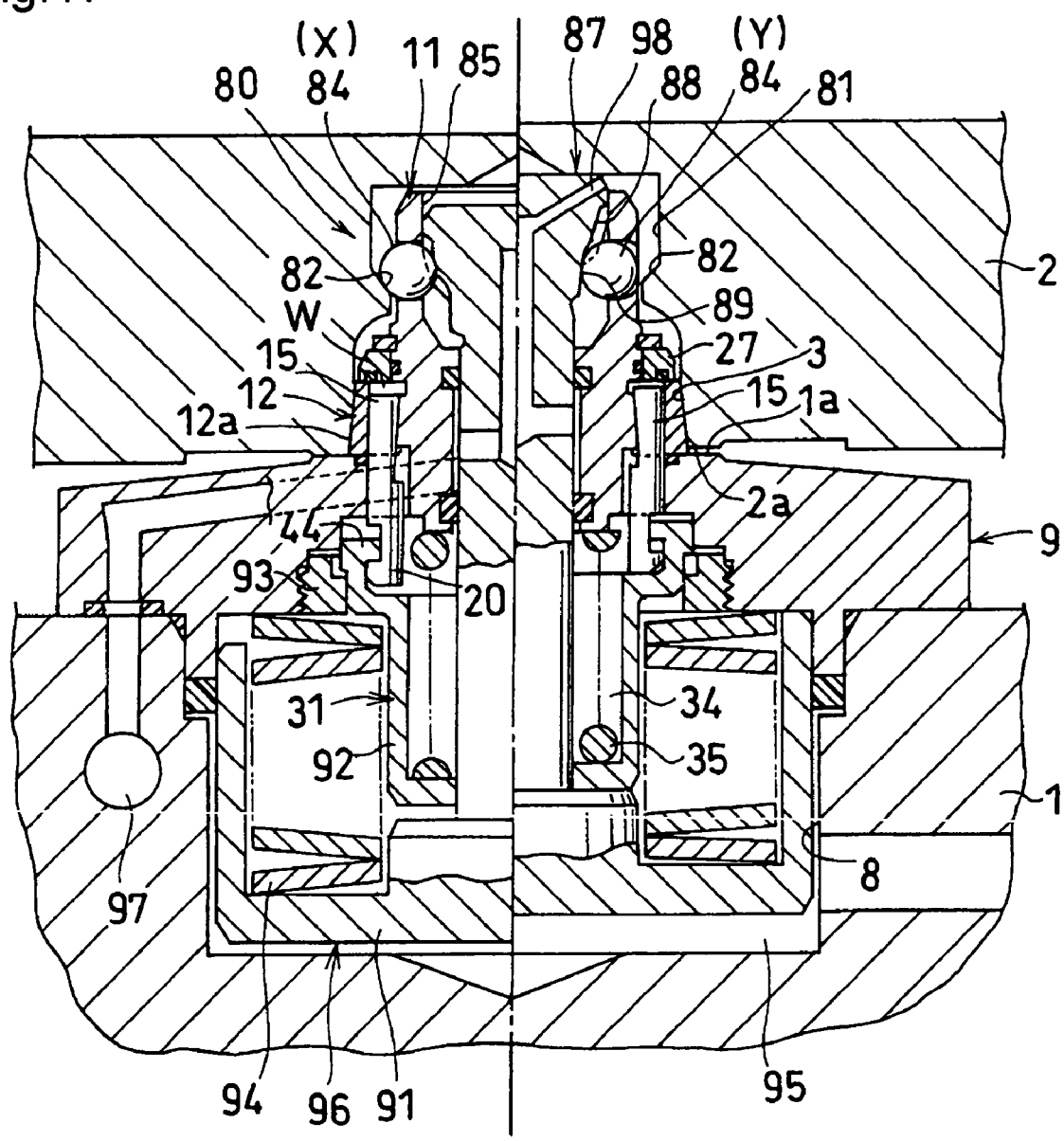
FIG. 17 is a view showing a positioning apparatus incorporating a clamping means of a fifth embodiment according to the present invention, the right half showing a released state while the left half a locked state.

FIG. 17 is a view similar to FIG. 2, showing a positioning apparatus incorporating a clamping means 80 of a fifth embodiment according to the present invention. It is noted that the right half of FIG. 17 is similar to FIG. 3A, showing a released state, while that the left half of FIG. 17 is similar to FIG. 4A, showing a locked state.

Here, the engaging hole 3 of the work pallet 2 and the outer peripheral surface 12a of the elastic sleeve 12 are both composed of a tapered surface which narrows upward. However, the engaging hole 3 and the outer peripheral surface 12a may be both composed of a straight surface.

The clamping means 80 is arranged as follows.

The engaging hole 3 and a clamping hole 81 are provided upward in the recited order. The lower part of the clamping hole 81 is composed of a tapered surface 82 which narrows downward. Also, the central pillar 11 is formed in a cylindrical shape and projected upward. A plurality of engaging balls (another engaging member) 84 are supported horizontally movably onto the peripheral wall of the projected portion circumferentially at predetermined intervals.

A rod 87 is inserted into a cylindrical hole 85 of the central pillar 11. In the upper part of the rod 87 are provided a tapered pressing surface 88 for moving the engaging balls 84 to an engaging position X, and an evacuating surface 89 for allowing the engaging balls 84 to move to a disengaging position Y.

In addition, a clamping piston 91 is inserted into the lower part of the housing 9 hermetically, the clamping piston 91 and the lower part of the rod 87 being connected to each other. A spring support 92 is fitted onto the lower half portion of the rod 87 vertically movably, and the lock chamber 34 is formed over the spring support 92, the lock spring 35 being disposed in the lock chamber 34. The spring support 92 is prevented from moving downward by more than a predetermined range by means of an adjusting bolt 93.

Between the clamping piston 91 and the housing 9 is disposed a clamp spring 94 composed of a plurality of coned disc springs, while between the clamping piston 91 and the bottom wall of the installation hole 8 is formed an unclamping hydraulic chamber 95.

The clamping means 80 is to be used as follows, for example.

In the released state shown in the right half of FIG. 17, pressurized oil is supplied to the hydraulic chamber 95 to allow the clamping piston 91 and the rod 87 to be moved up against the clamp spring 94. Consequently, the spring support 92 moves the wedge member 15 up against the lock spring 35 to contract the elastic sleeve 12 radially. Also, the engaging balls 84 are switched to the disengaging position Y.

It is noted that in the released state, the upper end of the rod 87 forces the work pallet 2 upward, whereby between the support surface 1a of the housing 9 and the surface 2a to be supported of the work pallet 2 is formed a contact gap. Also in the released state, between the outer peripheral surface 12a of the elastic sleeve 12 and the tapered engaging hole 3 is preferably formed a contact gap.

When positioning and fixing the work pallet 2 against the base plate 1, the pressurized oil in the hydraulic chamber 95 is discharged, and then the clamping piston 91 and the rod 87 are moved down by the clamp spring 94. Then, the output portion 44 of the spring support 92 first moves the wedge member 15 down due to the lock spring 35 as shown in the left half of FIG. 17, and then the wedge member 15 brings the elastic sleeve 12 into close contact with the engaging hole 3. Next, the clamp spring 94 switches the engaging balls 84 to the engaging position X through the tapered pressing surface 88 of the rod 87, and the engaging balls 84 press the tapered surface 82 in the lower part of the clamping hole 81 downward. Thus, the rod 87 is adapted to press the work pallet 2 strongly against the base plate 1 through the engaging balls 84.

In more detail, the driving means 31 for positioning is composed of the spring support 92, the lock spring 35, and the clamping piston 91. Also, a clamp driving means 96 is composed of the clamping piston 91 and the clamp spring 94.

It is noted that in the base plate 1 is provided a supply port 97 for compressed cleaning air, while in the leading end portion of the rod 87 is opened a discharge port 98. Then, the supply port 97 is communicated with the discharge port 98 through the housing 9, the lower half portion of the cylindrical hole 85 of the central pillar 11, and the rod in the recited order.

The clamping means 80 may be a hydraulic-lock type one instead of a spring-lock type one, and further may be a double-acting type one instead of a single-acting type one.

Figure 18:
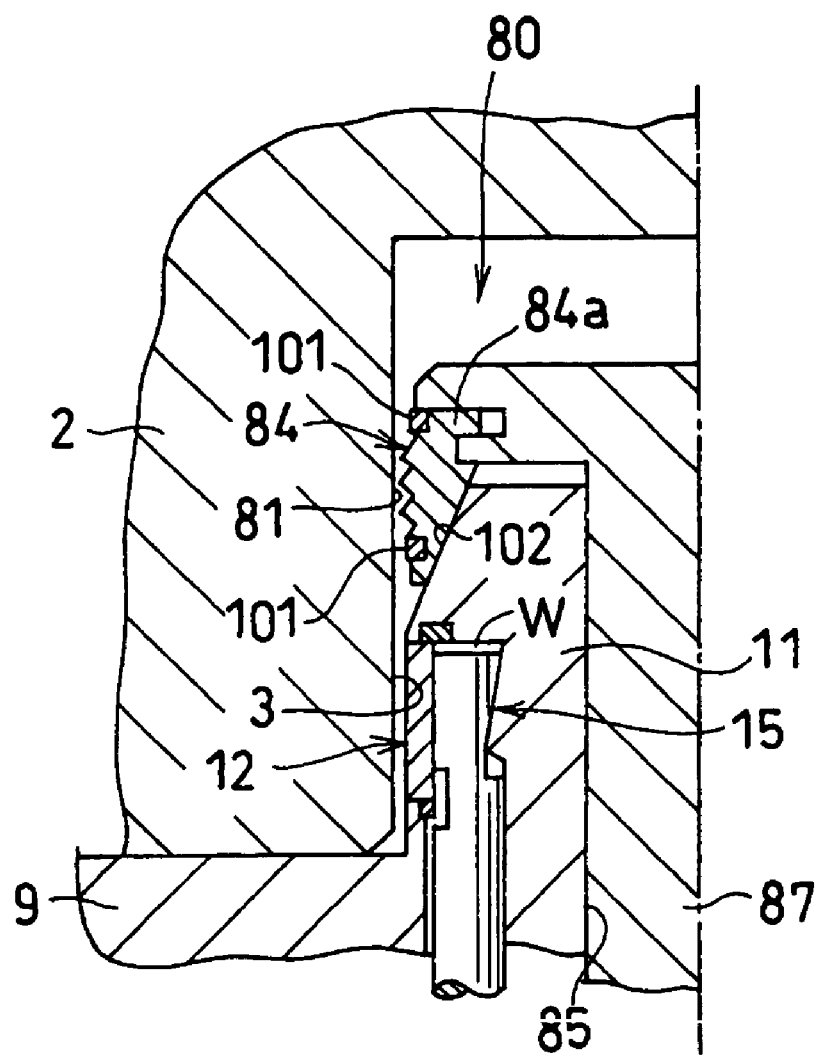
FIG. 18 is a partial view similar to the released state in the right half of FIG. 17, showing an exemplary variation of the clamping means.

FIG. 18 is a partial view similar to the released state in the right half of FIG. 17, showing an exemplary variation of the clamping means 80 according to the fifth embodiment.

The exemplary variation shown in FIG. 18 is different from the embodiment shown in FIG. 17 in the following points.

The second block 2 is composed of a work piece, and the engaging hole 3 of the second block 2 and the clamping hole 81 are both composed of a continuous straight circular hole. Also, the engaging member 84 for clamping is composed of a collet. The collet-type engaging member 84 is composed of a plurality of divided members 84a disposed annularly when viewed from above, these divided members 84a being contracted radially by means of annular resilient members 101 provided, respectively, in the upper and lower parts. It is noted that the annular resilient members 101 may be made of spring or rubber, etc.

When switching from the released state shown in the figure to a locked state, the collet-type engaging member 84 is moved down by the rod 87. Then, the engaging member 84 expands radially along a tapered surface 102 in the upper part of the central pillar 11, and the outer peripheral surface of each of the divided members 84a is brought into close contact strongly with the clamping hole 81, which allows the second block 2 composed of the work piece to be pressed against the housing 9.

Figure 19:
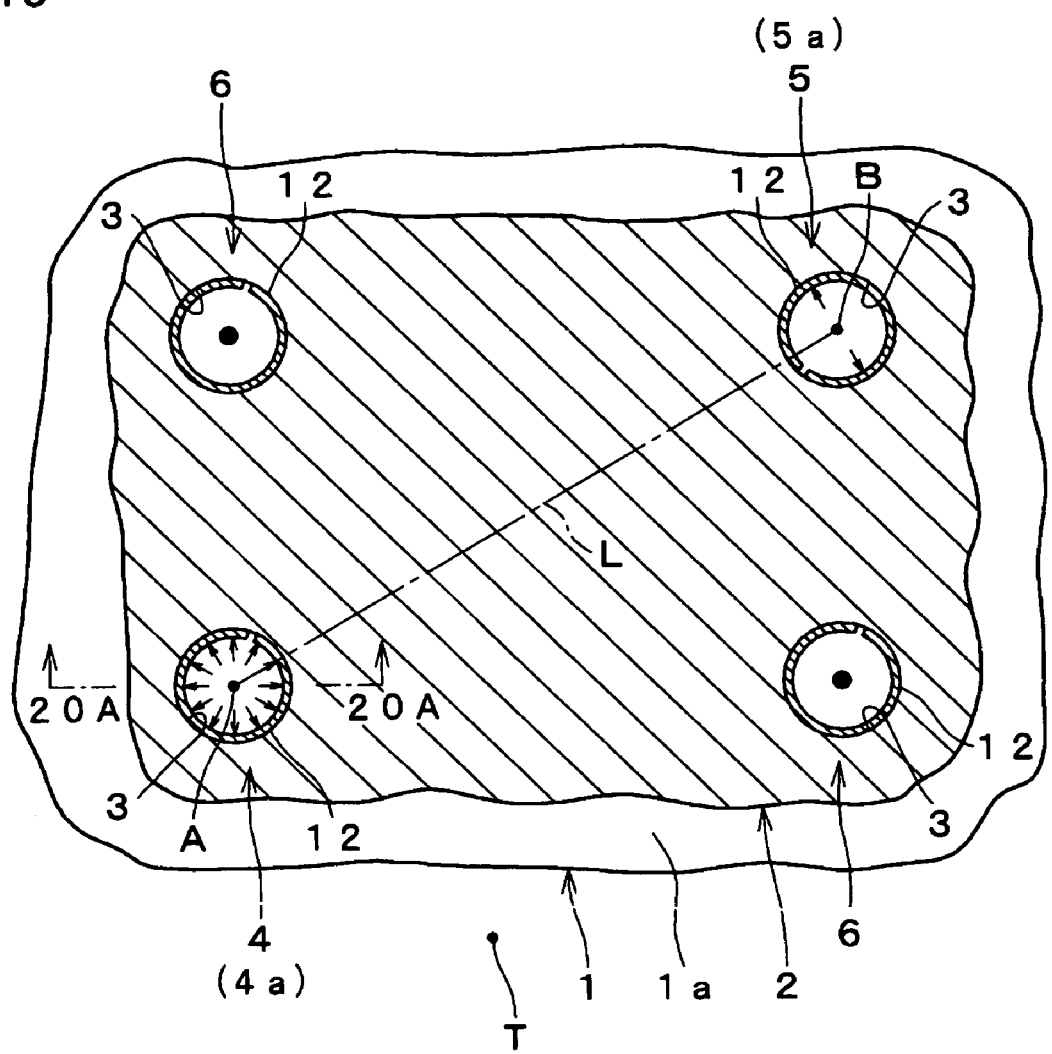
FIG. 19 is a view similar to FIG. 1, typically showing the basic principle of another pallet system utilizing the present invention as a positioning apparatus of a sixth embodiment according to the present invention.
Figure 20B:
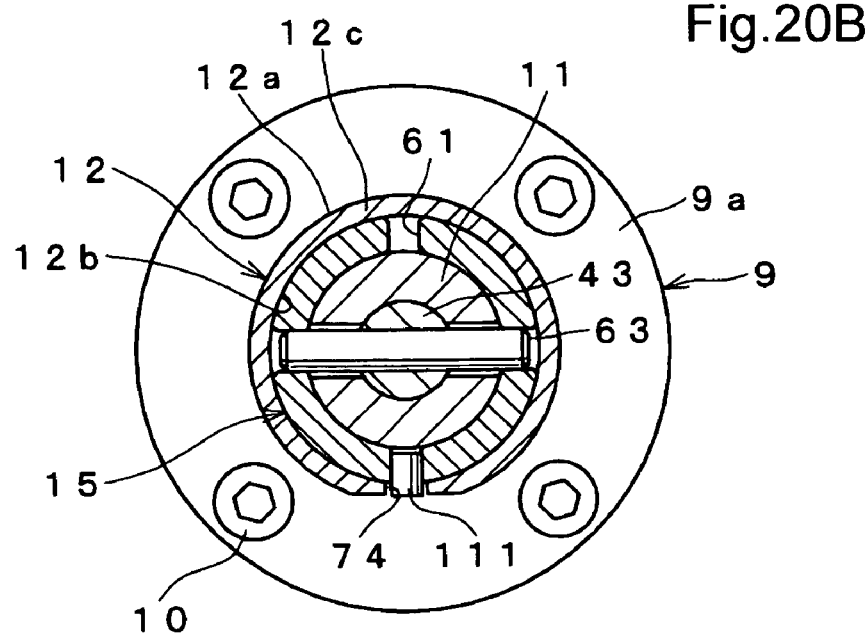
FIG. 20B is a cross-sectional view indicated by the arrow 20B—20B in FIG. 20A.
Figure 20A:
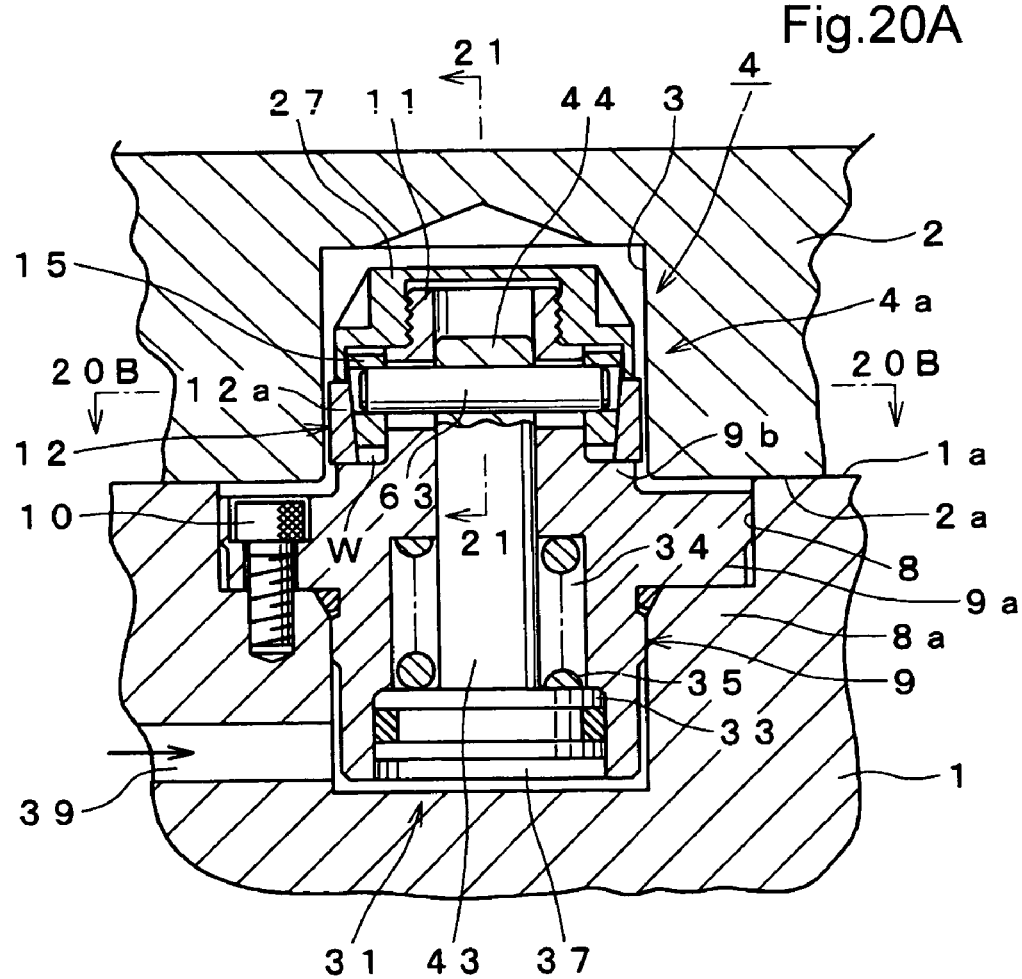
FIG. 20A is a cross-sectional view similar to FIG. 2 indicated by the arrow 20A—20A in FIG. 19.
Figure 21:
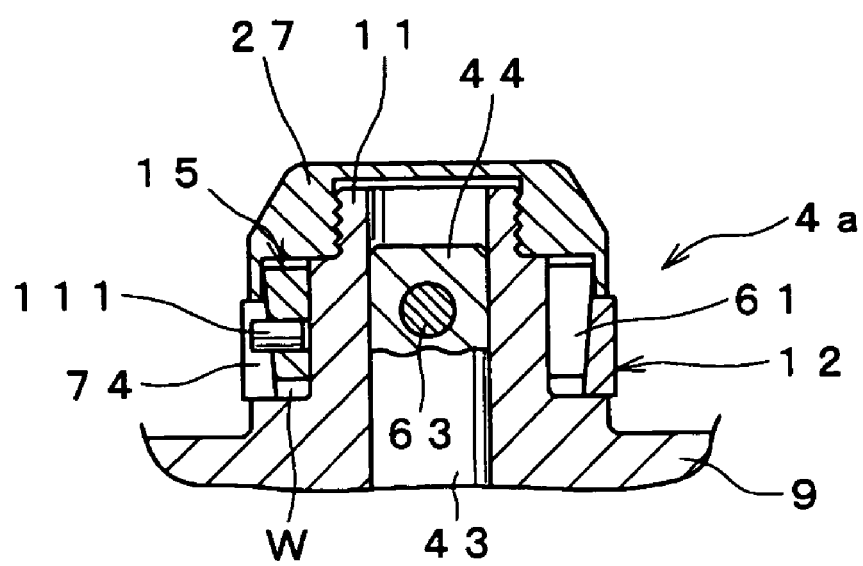
FIG. 21 is a cross-sectional view indicated by the arrow 21—21 in FIG. 20A.

FIG. 19 through FIG. 21 show the sixth embodiment according to the present invention. FIG. 19 is a view similar to FIG. 1, typically showing the basic principle of another pallet system utilizing the present invention. FIG. 20A is a cross-sectional view similar to FIG. 2 indicated by the arrow 20A—20A in FIG. 19. FIG. 20B is a cross-sectional view indicated by the arrow 20B—20B in FIG. 20A. FIG. 21 is a cross-sectional view indicated by the arrow 21—21 in FIG. 20A.

The sixth embodiment is different from the first embodiment shown in FIG. 1 through FIG. 5 in the following points.

As shown in FIG. 19, in the work pallet 2 are formed four engaging holes 3 at intervals. As is the case in FIG. 1, elastic sleeves (engaging members) 12 of, respectively, a first plug means (a plug means) 4 and a second plug means (another plug means) 5, which have a positioning function and a locking function, are inserted into two engaging holes 3 diagonally facing each other. Into the remaining two engaging holes 3 are inserted, respectively, elastic sleeves 12 of a third plug means 6, which have only a locking function.

A radially expansible mechanism 4a of the first plug means 4 expands the elastic sleeve 12 radially by the wedge action, as shown in FIG. 19, to allow substantially the entire circumference of the peripheral wall of the elastic sleeve 12 to be brought into close contact with the engaging hole 3, whereby the work pallet 2 is positioned and fixed horizontally against the base plate 1 through the elastic sleeve 12.

Also, a radially expansible mechanism 5a of the second plug means 5 applies a radially expansible force to the elastic sleeve 12 in two directions substantially perpendicular to a straight line L for connecting the axial centers A and B of central pillars 11 to be described hereinafter to bring the two circumferential portions of the elastic sleeve 12 into close contact with the engaging hole 3, whereby the work pallet 2 is prevented from rotating centering on the axial center A.

The third plug means 6 having the locking function supports the respective elastic sleeves 12 radially movably against a housing 9 to be described hereinafter, and thereby has no positioning function.

The first and second plug means 4 and 5 have the same structure except for the radially expansible mechanisms as mentioned above, having the following structures in common as shown in FIG. 20A, FIG. 20B and FIG. 21.

An annular central pillar 11 is projected from the housing 9, the elastic sleeve 12 being supported onto the outer periphery of the central pillar 11. The elastic sleeve 12 comprises a slit 74 extending in a vertically straight manner, and is composed of an annular collet, as is substantially the case in FIG. 16A.

The elastic sleeve 12 is inserted between the cap 27 fixed to the upper end of the central pillar 11 and the housing 9 being adapted to be diametrically expansible and contractible and vertically unmovable.

Between the central pillar 11 and the elastic sleeve 12 is formed an annular wedge space W in such a manner as to narrow downward. Here, the outer peripheral surface of the central pillar 11 is formed in a vertically straight manner, while the inner peripheral surface of the collet-type elastic sleeve 12 is formed in such a manner as to narrow downward.

A wedge member 15 is inserted into the wedge space W. The wedge member 15 is also provided with a slit 61 extending in a vertically straight manner, and is composed of an annular collet, as is substantially the case in FIG. 10A and FIG. 10B (or FIG. 11A and FIG. 11B).

A stopper pin 111 is projected radially outward from the wedge member 15, being inserted into the slit 74 of the elastic sleeve 12. This prevents the elastic sleeve 12 from rotating centering on the axial center.

Also as is the case in FIG. 10A, the output portion 44 inserted in the cylindrical hole of the central pillar 11 and the collet-type wedge member 15 are connected to each other through the connecting pin 63.

The sixth embodiment shows substantially the same operation as the first embodiment shown in FIG. 2.

That is, in the released state as shown in FIG. 20A through 21, pressurized oil is supplied to the release chamber 37. Thus, the piston 33 moves the output portion 44 up against the urging force of the lock spring 35, and then the output portion 44 moves the collet-type wedge member 15 up to be expanded radially slightly by its own elastic restoration force and to allow the elastic sleeve 12 to be switched to a radially contracted state by its own elastic restoration force.

When positioning the work pallet 2 in the base plate 1, the work pallet 2 is first moved down in the released state, as shown in FIG. 20A, to fit the engaging hole 3 to the elastic sleeve 12.

Next, the pressurized oil in the release chamber 37 is discharged. Then, the piston 33 comes down due to the urging force of the lock spring 35, which moves the wedge member 15 down strongly through the output portion 44. Thus, the wedge member 15 is contracted radially to expand the elastic sleeve 12 radially to be brought into close contact with the engaging hole 3. Consequently, the work pallet 2 is positioned against the base plate 1 through the elastic sleeve 12 which is radially expanded, the wedge member 15 which is radially contracted and brought into close contact with the central pillar 11, and the central pillar 11 in the recited order.

When switching from the locked state to the released state, it is only required to supply pressurized oil to the release chamber 37 as mentioned above. Thus, since the wedge member 15 is moved up and the elastic sleeve 12 is contracted radially by its own elastic restoration force, the lock state is to be released. Afterward, the work pallet 2 is to be moved up.

The sixth embodiment exhibits the advantage that since the amount of expansion and contraction of the elastic sleeve 12 can be increased, the radial gap between the engaging hole 3 and the elastic sleeve 12 can be set to larger value.

Figure 22:
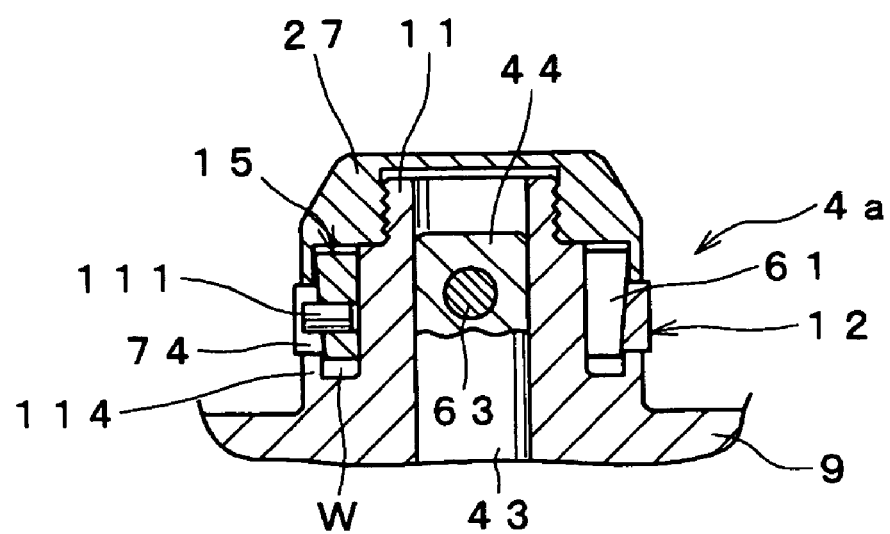
FIG. 22 is a view similar to FIG. 21, showing an exemplary variation of a radially expansible mechanism provided in the positioning apparatus.

FIG. 22 is a view similar to FIG. 21, showing an exemplary variation of the radially expansible mechanism 4a provided in the first plug means 4.

In the case above, the upper part of the housing 9 is projected upward on the outer periphery of the bottom portion of the annular wedge space W, the collet-type elastic sleeve 12 being supported between the annularly projected portion 114 and the cap 27. By means of this structure, the lower part of the slit 74 of the elastic sleeve 12 can be covered by the lower part of the wedge member 15. Consequently, it is possible to prevent foreign matter in the ambient atmosphere from entering the wedge space W.

It is noted that between the housing 9 and the elastic sleeve 12 may be disposed an annular sleeve (not shown in the figure) instead of projecting the annularly projected portion 114 from the housing 9.

Figure 23:
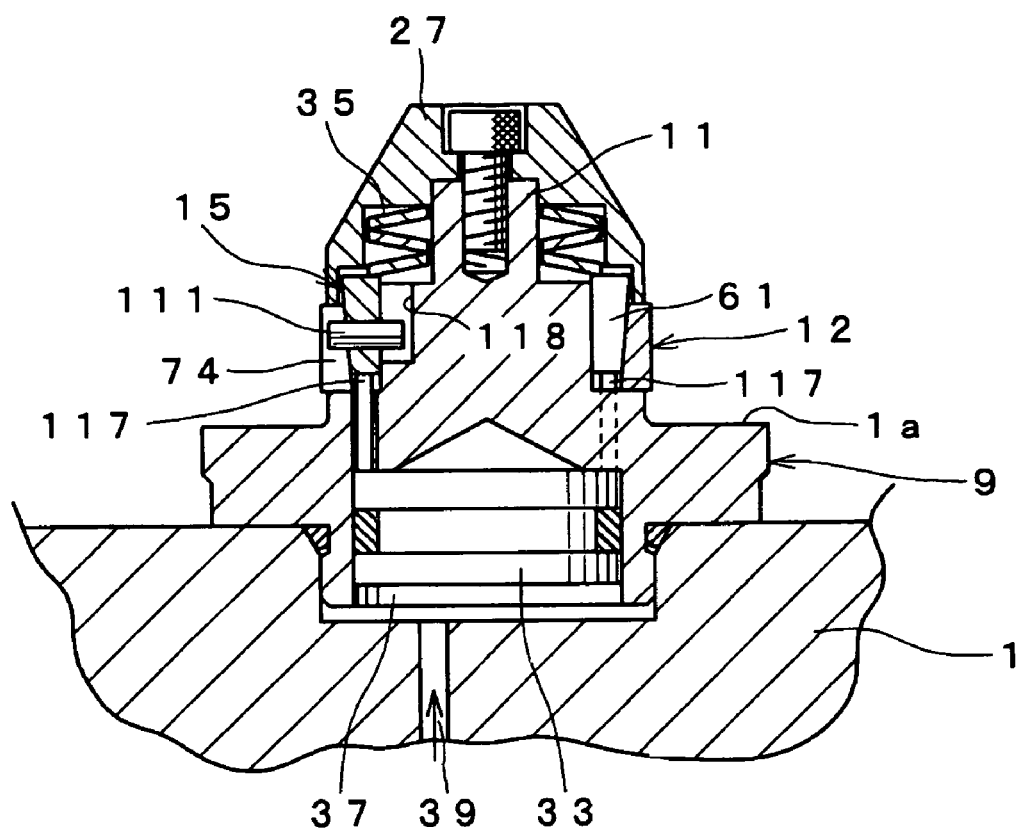
FIG. 23 is a view similar to FIG. 20A and FIG. 21, showing a positioning apparatus of a seventh embodiment according to the present invention.

FIG. 23 is a view similar to FIG. 20A and FIG. 21, showing the seventh embodiment according to the present invention.

In the case above, the lock spring 35 composed of a plurality of coned disc springs is disposed between the cap 27 and the wedge member 15. Also, the wedge member 15 and the piston 33 are connected to each other through a plurality of connecting rods 117 arranged circumferentially at intervals. The outer end of the stopper pin 111 fixed to the wedge member 15 is inserted in the slit 74 of the elastic sleeve 12, while the inner end of the pin 111 is inserted in a vertical groove 118 of the central pillar 11.

Figure 24:
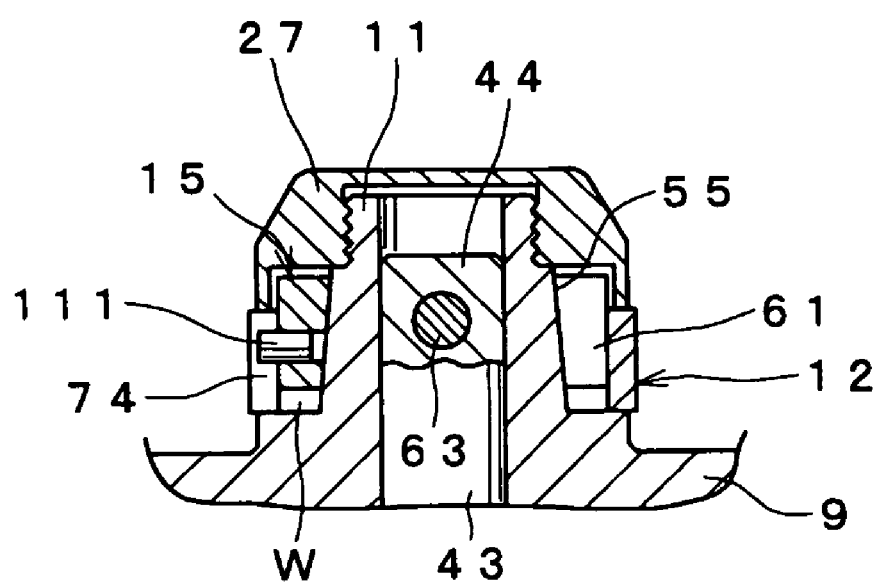
FIG. 24 is a view similar to FIG. 21, showing a positioning apparatus of an eighth embodiment according to the present invention.

FIG. 24 is a view similar to FIG. 21, showing the eighth embodiment according to the present invention.

In the case above, the inner peripheral surface of the elastic sleeve 12 is formed in a vertically straight manner, while the outer peripheral surface of the central pillar 11 is composed of a tapered surface which narrows upward.

FIG. 25A through 25F are views similar to FIG. 20B and corresponding to FIG. 5, showing, respectively, radially expansible mechanisms 5a of the second plug means 5.

Figure 25A:
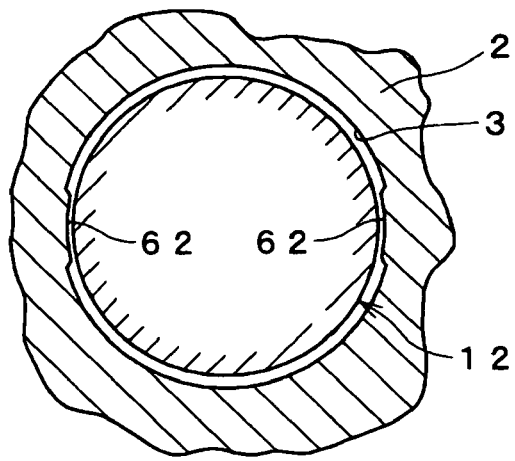
FIG. 25A through 25F are views similar to FIG. 20B, showing, respectively, first through sixth exemplary variations of another radially expansible mechanism provided in the pallet system.

In FIG. 25A, two projections 62 facing each other are provided in the engaging hole 3, and the entire outer periphery of the elastic sleeve 12 is formed in a circular shape.

Figure 25B:
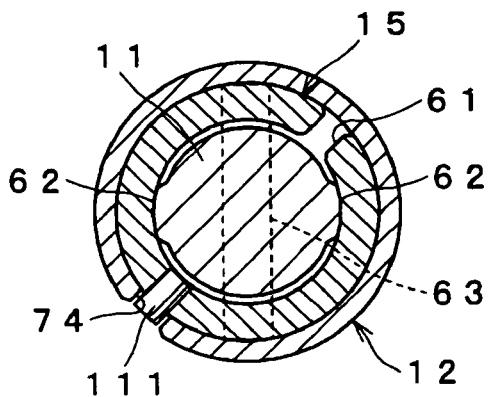

In FIG. 25B, the two projections 62 are provided on the outer periphery of the central pillar 11.

Figure 25C:
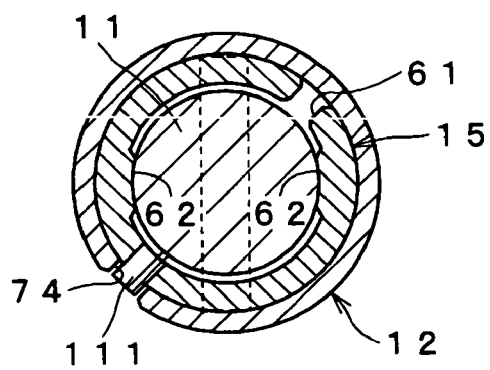

In FIG. 25C, the two projections 62 are provided on the inner periphery of the wedge member 15.

Figure 25D:
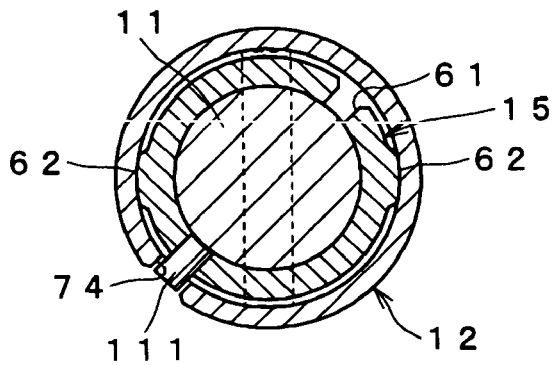

In FIG. 25D, the two projections 62 are provided on the outer periphery of the wedge member 15.

Figure 25E:
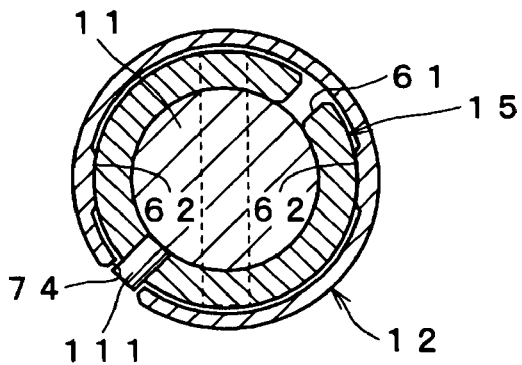

In FIG. 25E, the two projections 62 are provided on the inner periphery of the elastic sleeve 12.

Figure 25F:
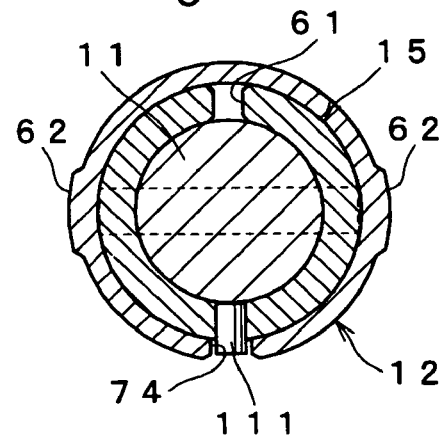

In FIG. 25F, the two projections 62 are provided on the outer periphery of the elastic sleeve 12.

Figure 26B:
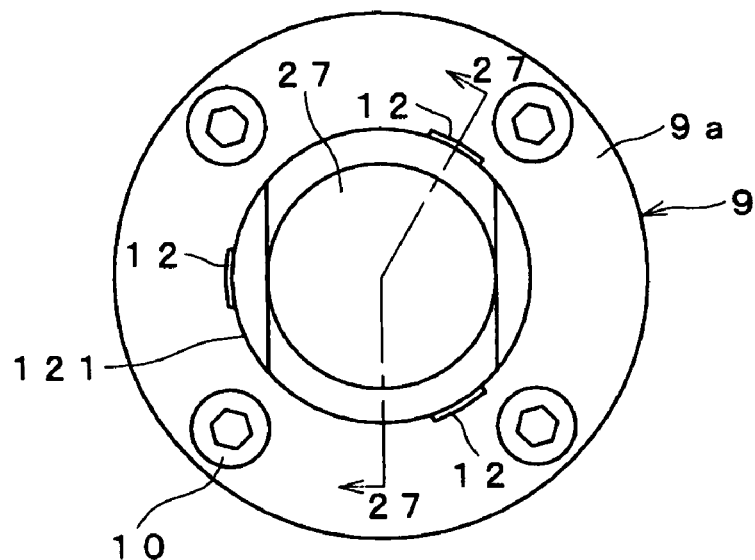
FIG. 26B is a plan view similar to FIG. 20B, showing a positioning apparatus of a ninth embodiment according to the present invention.
Figure 26A:
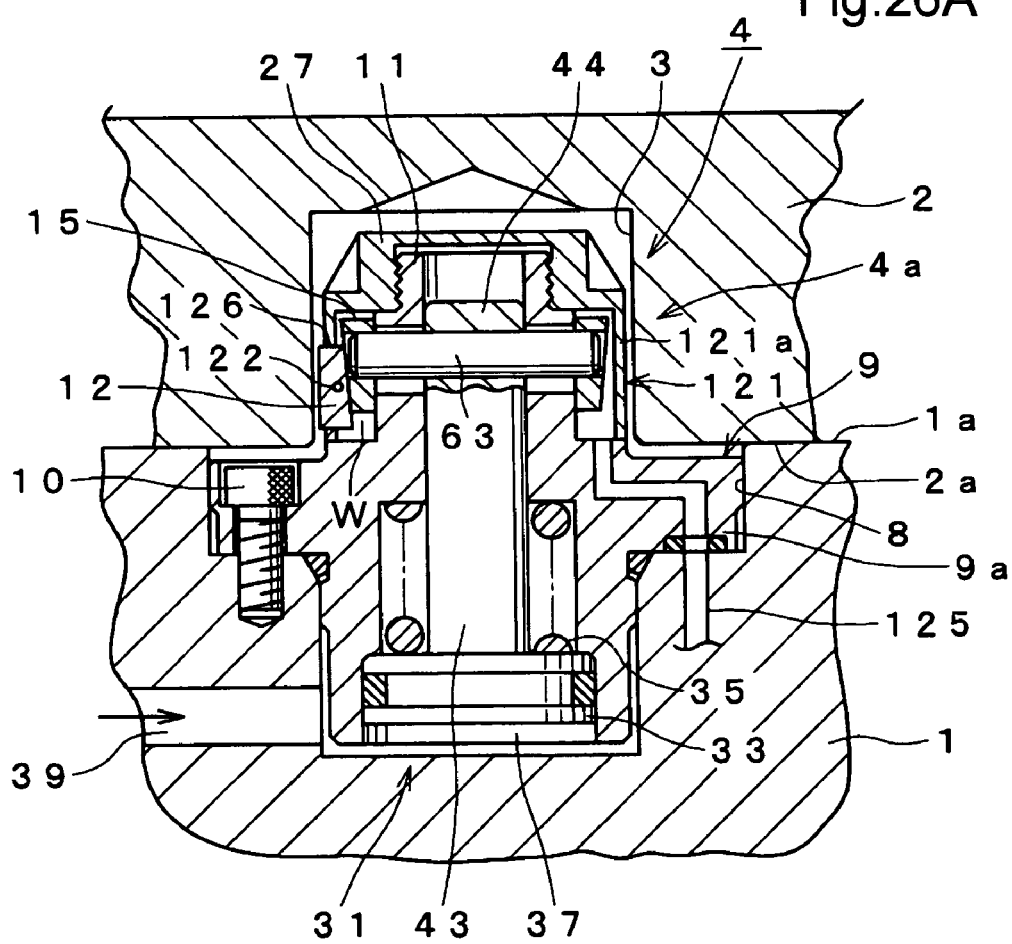
FIG. 26A is a view similar to FIG. 20A
Figure 27:
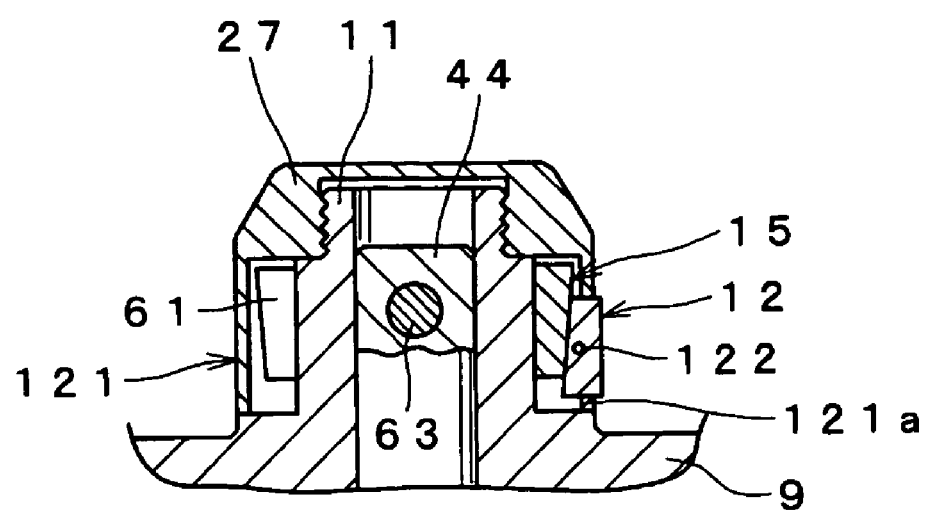
FIG. 27 is a cross-sectional view similar to FIG. 21 indicated by the arrow 27—27 in FIG. 26B.
Figure 28:
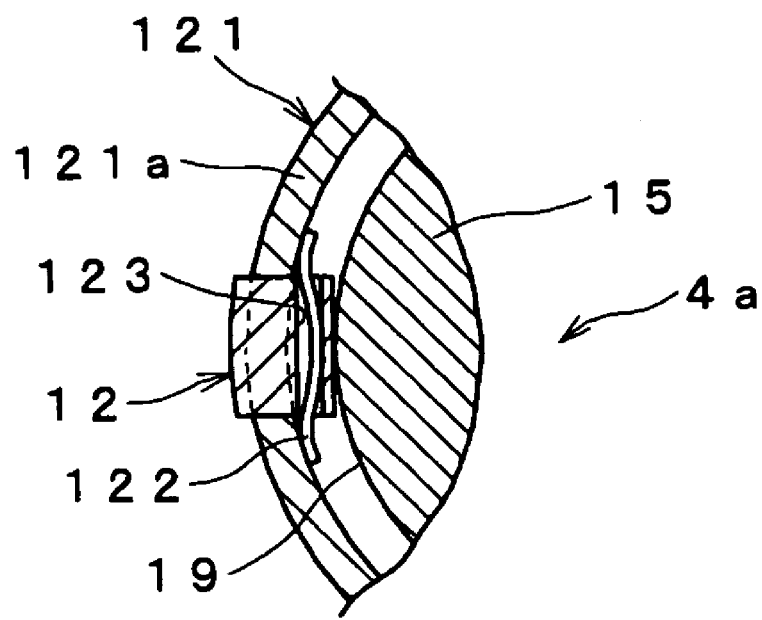
FIG. 28 is an enlarged horizontal cross-sectional view of a radially expansible mechanism in FIG. 26A.

FIG. 26A through FIG. 28 show the ninth embodiment according to the present invention. FIG. 26A is a view similar to FIG. 20A and FIG. 26B is a plan view similar to FIG. 20B. FIG. 27 is a cross-sectional view indicated by the arrow 27—27 in FIG. 26B. FIG. 28 is an enlarged horizontal cross-sectional view of a radially expansible mechanism 4a in FIG. 26A.

The first plug means 4 of the ninth embodiment is different from that of the sixth embodiment shown in FIG. 20A through 21 in the following points.

On the outer periphery of the wedge member 15 is arranged an annular plug 121 to be inserted into the engaging hole 3 instead of the collet-type elastic sleeve 12 diametrically expansible and contractible as shown in FIG. 20A. Here, the annular plug 121 is formed integrally with the cap 27. Three pressing members (engaging members) 12 are supported radially movably onto the peripheral wall 121a of the annular plug 121 circumferentially at intervals. The outer surface of the wedge member 15 is wedge-engaged downward with the inner surface of each of the pressing members 12. Also, each of the pressing members 12 is urged radially inward by a restoring means 122. Here, the restoring means 122 is composed of a rod spring disposed between the annular plug 121 and a through hole 123 of each of the pressing members 12.

The ninth embodiment shows an operation different from the foregoing embodiments in that in a locking operation, the pressing members 12 supported onto the annular plug 121 are projected radially outward to allow the outer surface thereof to be brought into close contact strongly with the engaging hole 3.

It is noted that the base plate 1 is provided with a supply port 125 for a cleaning fluid such as compressed air, and a discharge port 126 for the cleaning fluid is composed of the fitting gap between the peripheral wall 121a of the annular plug 121 and the pressing members 12, the discharge port 126 being communicated with the supply port 125 through the wedge space W. This allows the fitting gap to be cleaned automatically, allowing the pressing members 12 to move smoothly with a high degree of accuracy.

Figure 29:
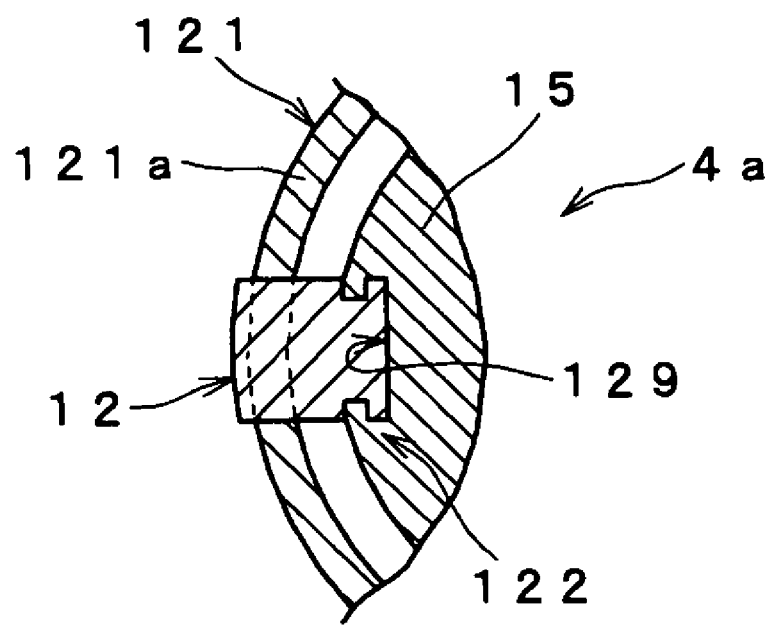
FIG. 29 is a view similar to FIG. 28, showing an exemplary variation of the radially expansible mechanism.

FIG. 29 is a view similar to FIG. 28, showing an exemplary variation of the restoring means 122 provided in the radially expansible mechanism 4a. In this case, in the outer peripheral surface of the wedge member 15 are provided inclined grooves 129 circumferentially at intervals, the inclined grooves 129 being formed in a T shape when viewed from above. The restoring means 122 is formed as a fitting structure between the both side walls of the inclined groove 129 and the inner end portion of the pressing member 12.

It is noted that the inclined grooves 129 may be formed in a V shape, etc., instead of being formed in a T shape when viewed from above.

The pressing members 12 may be engaged with the outer surface of the wedge member 15 indirectly through another member instead of being engaged therewith directly. The number of the pressing members 12 provided may be two, or four or more instead of being three as presented as an example.

In addition, the outer surface of the pressing members 12 may be formed in a serrated or irregular manner instead of being formed in a vertically straight manner.

Figure 30:
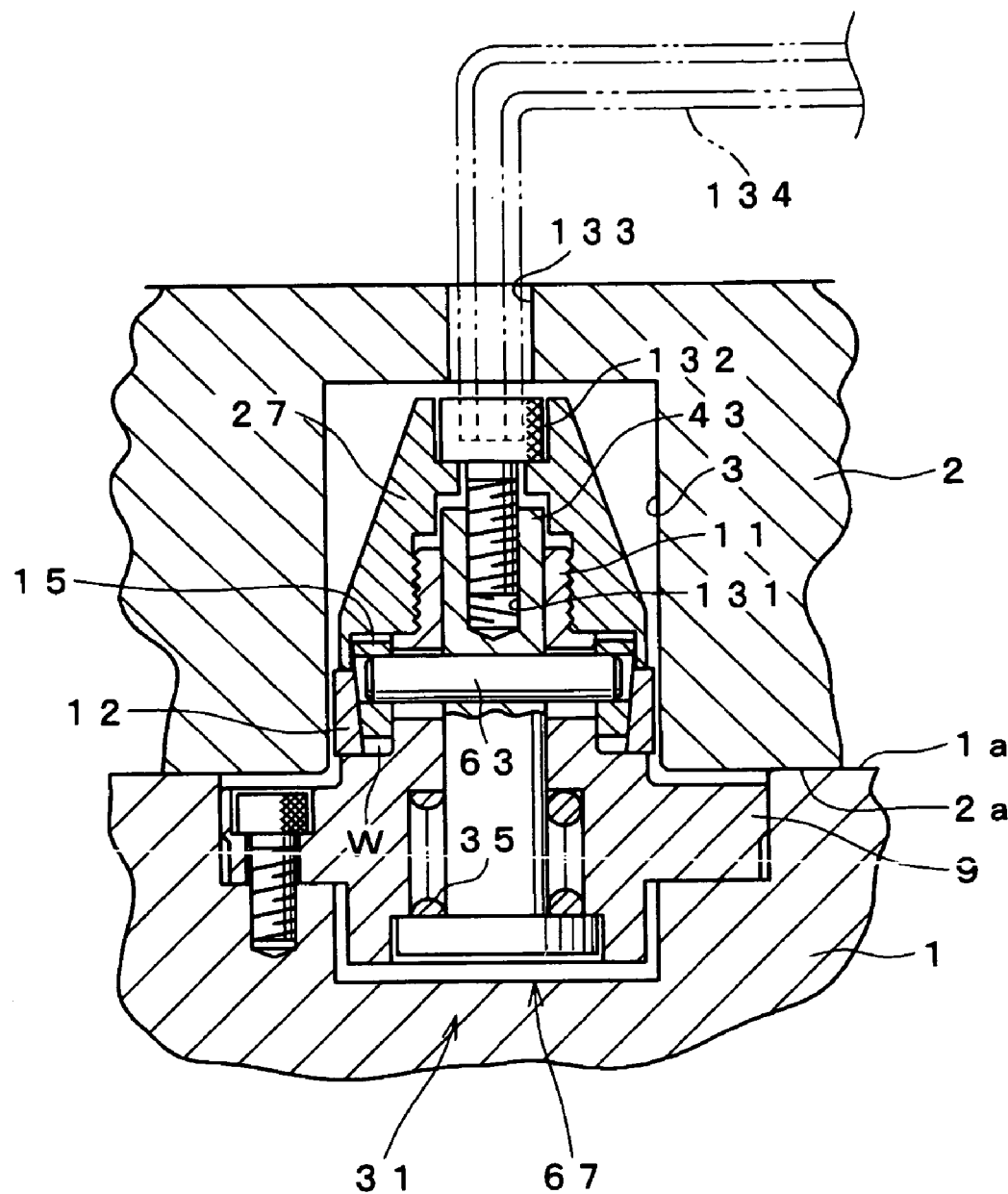
FIG. 30 is a view similar to FIG. 20A, showing a positioning apparatus of a tenth embodiment according to the present invention.

FIG. 30 is a view showing the tenth embodiment according to the present invention, in which the embodiment shown in FIG. 13 is applied to that shown in FIG. 20A.

In the case above, an upper rod 43 is projected upward from the spring support 67 of the driving means 31, and in the upper part of the upper rod 43 is formed a female screw 131, a hexagon socket head cap bolt 132 being screwed into the female screw 131.

In the released state shown in the figure, the bolt 132 is rotated and tightened using a hexagonal wrench 134 inserted in an operation hole 133 of the work pallet 2. Thus, the spring support 67 is moved up against the lock spring 35, and the wedge member 15 is moved upward to be released by the upper rod 43 of the spring support 67 through the connecting pin 63. When switching from the released state to a locked state, the bolt 132 is rotated and loosened. Then, the spring support 67 is moved down due to the lock spring 35, and the wedge member 15 is moved downward to be locked by the connecting pin 63.

Figure 31:
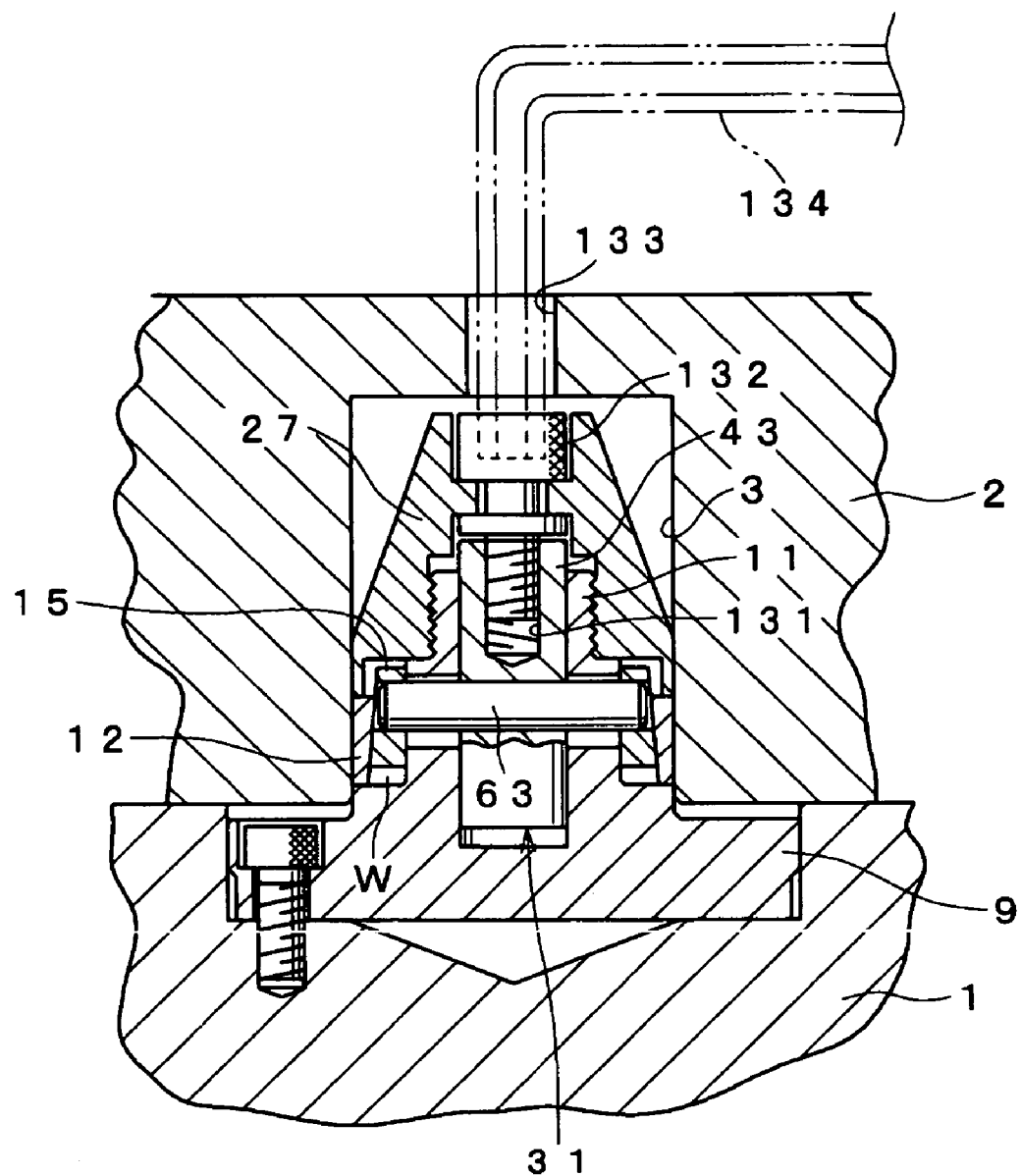
FIG. 31 is a view similar to FIG. 30, showing a positioning apparatus of an eleventh embodiment according to the present invention.

FIG. 31 is a view similar to FIG. 30, showing the eleventh embodiment according to the present invention. The eleventh embodiment is different from the embodiment shown in FIG. 30 in the following points.

The hexagon socket head cap bolt 132 is supported rotatably and vertically unmovably into the cap 27 fixed to the central pillar 11. Also, the wedge spaces W and the wedge members 15 are formed in such a manner as to narrow upward.

In the locked state shown in the figure, the bolt 132 is rotated and tightened to move the rod 43 up, and the wedge member 15 is moved upward to be locked. When switching from the locked state to a released state, the bolt 132 is rotated and loosened. Then, the rod 43 comes down to move the wedge member 15 downward to be released.

Figure 32:
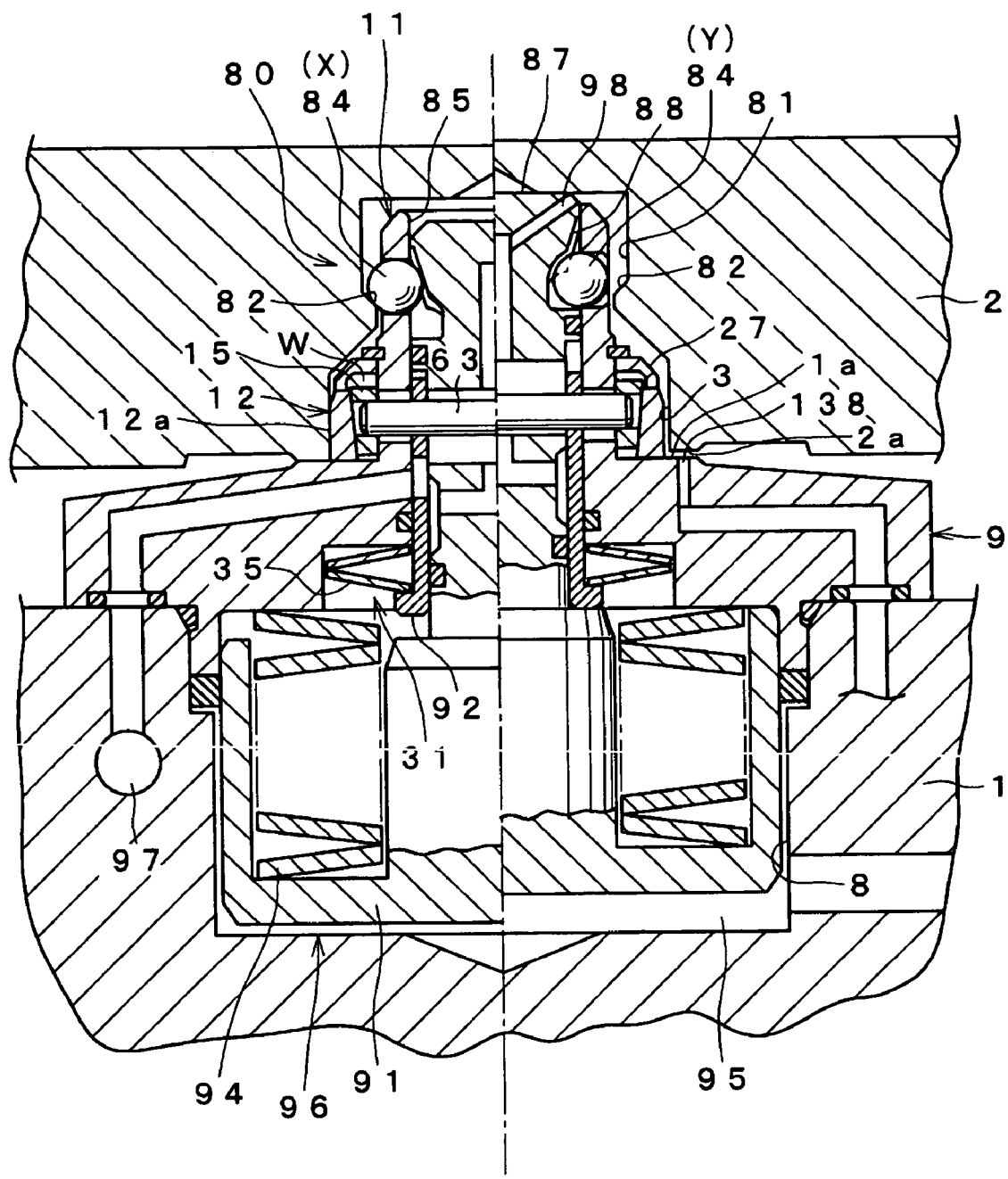
FIG. 32 is a view showing a positioning apparatus incorporating a clamping means of a twelfth embodiment according to the present invention, the right half showing a released state while the left half a locked state.

FIG. 32 is a view showing a positioning apparatus incorporating a clamping means of a twelfth embodiment according to the present invention, the right half showing a released state while the left half a locked state.

The embodiment shown in FIG. 32 is obtained by applying the embodiment shown in FIG. 20A to that shown in FIG. 17, having a structure different from that shown in FIG. 17 in the following points.

The elastic sleeve 12 employs a collet instead of a thin-walled cylinder, the outer peripheral surface thereof being formed in a vertically straight manner and the inner peripheral surface thereof being formed in such a manner as to narrow downward. The outer peripheral surface of the central pillar 11 is also formed in a vertically straight manner. Further, the wedge member 15 is formed as an annular collet, the peripheral wall thereof being formed in such a manner as to narrow downward.

When positioning and fixing the work pallet 2 against the base plate 1, the pressurized oil in the hydraulic chamber 95 is discharged, and then the clamping piston 91 and the rod 87 are moved down by the clamp spring 94. Then, the spring support 92 first moves the wedge member 15 down due to the lock spring 35, which is composed of two coned disc springs, through the connecting pin 63 as shown in the left half of FIG. 32, and then the wedge members 15 bring the elastic sleeve 12 into close contact with the engaging hole 3. Next, the clamp spring 94 switches the engaging balls (another engaging member) 84 to the engaging position X through the tapered pressing surface 88 of the rod 87, and the engaging balls 84 press the tapered surface 82 in the lower part of the clamping hole 81 downward. Thus, the rod 87 is adapted to press the work pallet 2 strongly against the base plate 1 through the engaging balls 84.

In more detail, the driving means 31 for positioning is composed of the spring support 92, the lock spring 35, and the clamping piston 91. Also, a clamp driving means 96 is composed of the clamping piston 91 and the clamp spring 94.

It is noted that in the support surface 1a of the housing 9 is opened a detection nozzle hole 138 for compressed air to confirm that the work pallet 2 is seated.

The foregoing embodiments and exemplary variations can be further changed as follows.

The plurality of wedge members 15 of the first embodiment may also employ divided members obtained by cutting an annular cylinder, which is arranged in a predetermined shape by lathe turning, etc., circumferentially at the same intervals instead of a pin or a rod processed mechanically.

The number of the wedge members 15 may be four or more instead of being one to three.

The shape of the wedge spaces W and the wedge members 15 can include various kinds of changes made by those skilled in the art without restricting the shapes presented as examples. For example, each of the wedge members 15 may also be composed of a rolling member such as a ball or a roller.

The urging means for locking of the driving means 31 for positioning may be composed of a rubber or a gas spring, etc., instead of the spring 35 presented as an example. The driving means 31 may be a spring-return type one instead of a spring-lock type one, and further a hydraulic double-acting type one instead of a hydraulic single-acting type one. Pressure fluid used for locking or releasing may be gas such as compressed air instead of the pressurized oil presented as an example.

The combination of the first block and the second block may be the combination of a table of a machine tool and a work pallet, the combination of a work pallet and a jig base, the combination of a jig base and a work piece, or the combination of a working jig such as a welding jig and a working article such as a work piece instead of the combination of the base plate 1 and the work pallet 2 presented as an example. The present invention may also be applied to the positioning of work piece, tools, etc., of various kinds of processing machines such as laser processing machines and electric discharge processing machines.

It is noted that instead of using the two different plug means 4 and 5 as presented as an example in FIG. 1 (or FIG. 19), one or a plurality of one of the plug means may be used, or three or more different pairs of the plug means 4 and 5 may also be combined to be used for the positioning apparatus according to the present invention.

What is claimed is:

1. A positioning apparatus, comprising:
    a support surface (1a) of a first block (1), supporting a surface (2a) to be supported of a second block (2);
    a central pillar (11) projecting from the support surface (1a) toward a leading end, and fixed to the first block (1);
    an engaging member (12) inserted into an engaging hole (3) opened in the surface (2a) to be supported, and supported onto the first block (1) in an outer peripheral space of the central pillar (11);
    a wedge space (W) narrowing in one axial direction, and arranged between the central pillar (11) and the engaging member (12);
    a wedge member (15) inserted into the wedge space (W), and configured to be axially movable therein; and
    said wedge member (15) configured to be axially movable by a driving device (31).

2. The positioning apparatus as set forth in claim 1, wherein,
    said engaging member is composed of an annular elastic sleeve (12).

3. The positioning apparatus as set forth in claim 1, including
    an annular plug (121) inserted into said engaging hole (3) is arranged on a outer periphery of the wedge member (15); and
    said engaging member is composed of a plurality of pressing members (12) arranged circumferentially at intervals,
    said pressing members (12) is supported onto a peripheral wall (121a) of the annular plug (121) configured to be radially movable,
    said pressing members (12) is configured to be movable radially inward by a restoring device (122).

4. A positioning apparatus, comprising:
    a support surface (1a) of a first block (1), supporting a surface (2a) to be supported of a second block (2);
    a central pillar (11) projecting from the support surface (1a) toward a leading end, and fixed to the first block (1);
    an elastic sleeve (12) fitting to an engaging hole (3) opened in the surface (2a) to be supported, and supported onto the first block (1) in an outer peripheral space of the central pillar (11);
a wedge space (W) narrowing in one axial direction, and arranged between the central pillar (11) and the elastic sleeve (12);
a wedge member (15) inserted into the wedge space (W), and configured to be axially movable therein; and
a driving device (31) for moving the wedge member (15) axially provided in the first block (1).

5. The positioning apparatus as set forth in claim 1, wherein
said central pillar (11) is formed integrally with the first block (1).

6. The positioning apparatus as set forth in claim 1, including
a ceiling wall (27) on the central pillar (11), covering a leading end portion of said wedge space (W).

7. The positioning apparatus as set forth in claim 2, including
a ceiling wall (27) on the central pillar (11), covering a leading end portion of the wedge space (W); and
a leading end surface of the elastic sleeve (12) is supported onto the ceiling wall (27) and configured to be radially movable thereon,
a base end surface of the elastic sleeve (12) is supported onto a supporting portion (9b) of the first block (1) and configured to be radially movable thereon.

8. The positioning apparatus as set forth in claim 1, wherein
a plurality of said wedge spaces (W) are arranged circumferentially at predetermined intervals,
a plurality of said wedge members (15) are inserted into the respective wedge spaces (W),
each of the wedge members (15) includes a wedge surface (19) in a leading end portion, and an input portion (20) in a base end portion, and
the input portion (20) is connected to an output portion (44) of the driving device (31) and configured to be movable radially relatively.

9. The positioning apparatus as set forth in claim 1, wherein
said wedge space (W) is formed in an annular shape.

10. The positioning apparatus as set forth in claim 9, wherein
said wedge member (15) is composed of an annular collet and configured to be radially expansible by its elastic restoring force.

11. The positioning apparatus as set forth in claim 8, wherein
both said wedge space (W) and said wedge member (15) are formed in such a manner as to narrow toward the base end.

12. The positioning apparatus as set forth in claim 8, wherein
both said wedge space (W) and said wedge member (15) are formed in such a manner as to narrow toward the leading end.

13. The positioning apparatus as set forth in claim 11, including
a plurality of inclined grooves (17) inclined toward the leading end on the outer periphery of the central pillar (11).

14. The positioning apparatus as set forth in claim 11, including
either a tapered surface (55) narrowing toward the leading end or a plurality of inclined surfaces inclined toward the leading end, on the outer periphery of the central pillar (11).

15. The positioning apparatus as set forth in claim 11, wherein
the engaging member (12) includes a tapered surface narrowing toward the base end on the inner periphery thereof.

16. The positioning apparatus as set forth in claim 12, wherein
the engaging member (12) includes a tapered surface narrowing toward the leading end on the inner periphery thereof.

17. The positioning apparatus as set forth in claim 2, wherein
said elastic sleeve (12) is composed of a thin-walled cylinder formed integrally in a circumferentially seamless manner,
an annular wall (12c) of the elastic sleeve (12) includes a plurality of radially expandible portions (51), which are arranged circumferentially at intervals thereon and configured to be elastically deformable radially outward and restorable radially inward by their own elastic restoring force.

18. The positioning apparatus as set forth in claim 2, including
a slit (74) or at least one through groove (76) in the peripheral wall of the elastic sleeve (12); and
the elastic sleeve (12) is configured to be radially contractible by its own elastic restoring force.

19. The positioning apparatus as set forth in claim 18, including
an elastic sealing member (75) made of rubber or synthetic resin, etc., disposed in the slit (74) or the through groove (76).

20. The positioning apparatus as set forth in claim 17, including
a plurality of projections (62) extending axially circumferentially at intervals on at least one of either the inner or outer periphery of the elastic sleeve (12), an inner or outer periphery of the wedge member (15), the outer periphery of the central pillar (11), or the engaging hole (3).

21. The positioning apparatus as set forth in claim 1, wherein
said engaging hole (3) is formed as a substantially circular straight hole,
an outer peripheral surface (12a) of the engaging member (12) is formed as a substantially circular straight surface.

22. The positioning apparatus as set forth in claim 1, wherein
said engaging hole (3) is formed as a substantially circular tapered hole which narrows inward,
an outer peripheral surface (12a) of the engaging member (12) is formed as a tapered surface which narrows toward the leading end.

23. The positioning apparatus as set forth in claim 1, wherein said engaging hole (3) and a clamping hole (81) are provided in the second block (2) inward in the recited order, another engaging member (84), configured to engage with the clamping hole (81), is supported onto the central pillar (11), a rod (87) for engaging the engaging member (84) with the clamping hole (81) and pulling the engaging member (84) toward the base end is inserted into a cylindrical hole (85) of the central pillar (11), and said rod (87) is connected to a clamp driving device (96).

24. The positioning apparatus as set forth in claim 23, wherein said first block (1) includes a supply port (97) for a cleaning pressure fluid, said rod (87) includes a discharge port (98) in a leading end portion thereof, and the supply port (97) and the discharge port (98) are communicated with each other.

\* \* \* \* \*